(12) United States Patent
Gohshi

(10) Patent No.: US 8,824,825 B2
(45) Date of Patent: *Sep. 2, 2014

(54) DECODING DEVICE WITH NONLINEAR PROCESS SECTION, CONTROL METHOD FOR THE DECODING DEVICE, TRANSMISSION SYSTEM, AND COMPUTER-READABLE RECORDING MEDIUM HAVING A CONTROL PROGRAM RECORDED THEREON

(75) Inventor: Seiichi Gohshi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 95 days.

This patent is subject to a terminal disclaimer.

(21) Appl. No.: 13/504,351

(22) PCT Filed: Jun. 23, 2010

(86) PCT No.: PCT/JP2010/060682
§ 371 (c)(1),
(2), (4) Date: Apr. 26, 2012

(87) PCT Pub. No.: WO2011/061958
PCT Pub. Date: May 26, 2011

(65) Prior Publication Data
US 2012/0213289 A1  Aug. 23, 2012

(30) Foreign Application Priority Data

Nov. 17, 2009 (JP) .................. 2009-262338

(51) Int. Cl.
*G06K 9/40* (2006.01)
*H04N 7/26* (2006.01)
*G06T 5/00* (2006.01)
*H04N 5/208* (2006.01)

(52) U.S. Cl.
CPC .......... *G06T 5/004* (2013.01); *H04N 19/00533* (2013.01); *H04N 5/208* (2013.01); *G06T 2207/10016* (2013.01)
USPC ...................................................... 382/263

(58) Field of Classification Search
None
See application file for complete search history.

(56) References Cited

U.S. PATENT DOCUMENTS 5,063,445 A * 11/1991 Nishizawa et al. ...... 375/240.25
5,089,889 A    2/1992 Sugiyama
(Continued)

FOREIGN PATENT DOCUMENTS

EP  2 026 560   2/2009
EP  2 124 430  11/2009
(Continued)

OTHER PUBLICATIONS

Seiichi Goshi et al., "A Novel Super Resolution Method and Non-Linear Function", Forum on Information Technology, 2009 (held from Sep. 2 through 4, 2009).
Seiichi Gohshi, "A New Signal Processing Method for VIDEO-Reproduce the Frequency Spectrum Exceeding the Nyquist Frequency—"Multimedia System Conference (announced on Feb. 22, 2012).
(Continued)

*Primary Examiner* — Bhavesh Mehta
*Assistant Examiner* — Feng Niu
(74) *Attorney, Agent, or Firm* — Harness, Dickey & Pierce, P.L.C.

(57) ABSTRACT

Disclosed is a decoding device (300a) that outputs an output signal by receiving, as an input, an encoded signal including a signal in which an original signal is encoded, the original signal being indicative of contents of at least one of image and audio, and the output signal being indicative of the contents, which decoding device includes a decoding process section (310) that generates a decoded signal be decoding the encoded signal, and a nonlinear process section (102) that generates a nonlinear process signal (i) in which positive and negative signs of a low-frequency-free signal are retained, which low-frequency-free signal is obtained by removing from the input signal at least a direct current of frequency components included in the decoded signal, and (ii) which broadly monotonically increases nonlinearly with respect to the low-frequency-free signal when values of the low-frequency-free signal are at least in the vicinity of 0; the nonlinear process signal is added to the decoded signal, to generate the output signal.

10 Claims, 24 Drawing Sheets

(56) References Cited

U.S. PATENT DOCUMENTS

| | | | |
|---|---|---|---|
| 5,144,426 A | 9/1992 | Tanaka et al. | |
| 5,150,432 A | 9/1992 | Ueno et al. | |
| 5,321,511 A | 6/1994 | Min | |
| 5,459,514 A * | 10/1995 | Sakamoto et al. | 375/240.11 |
| 5,495,292 A * | 2/1996 | Zhang et al. | 375/240.02 |
| 5,606,375 A | 2/1997 | Lee | |
| 5,694,491 A | 12/1997 | Brill et al. | |
| 5,708,693 A | 1/1998 | Aach et al. | |
| 5,719,966 A | 2/1998 | Brill et al. | |
| 5,805,721 A | 9/1998 | Vuylsteke et al. | |
| 6,115,071 A | 9/2000 | Hurst, Jr. et al. | |
| 6,173,084 B1 | 1/2001 | Aach et al. | |
| 6,285,710 B1 | 9/2001 | Hurst, Jr. et al. | |
| 6,295,322 B1 | 9/2001 | Arbeiter et al. | |
| 6,377,313 B1 | 4/2002 | Yang et al. | |
| 6,466,625 B1 | 10/2002 | Kobayashi et al. | |
| 6,606,419 B2 * | 8/2003 | Nakaya | 382/251 |
| 6,658,379 B1 | 12/2003 | Ogata | |
| 6,732,070 B1 | 5/2004 | Rotola-Pukkila et al. | |
| 6,791,716 B1 | 9/2004 | Buhr et al. | |
| 6,973,127 B1 * | 12/2005 | Kolesnik et al. | 375/240.11 |
| 7,590,589 B2 | 9/2009 | Hoffberg | |
| 7,633,354 B2 | 12/2009 | Kuijk et al. | |
| 7,970,212 B2 | 6/2011 | Zahavi et al. | |
| 8,204,332 B2 | 6/2012 | Sun | |
| 8,427,256 B2 * | 4/2013 | Gohshi | 333/28 R |
| 8,508,667 B2 * | 8/2013 | Goshi | 348/627 |
| 2002/0090207 A1 | 7/2002 | Mishima et al. | |
| 2002/0181583 A1 | 12/2002 | Corbera | |
| 2003/0151684 A1 | 8/2003 | Shimazaki et al. | |
| 2003/0210829 A1 | 11/2003 | Someya et al. | |
| 2003/0218776 A1 | 11/2003 | Morimoto et al. | |
| 2004/0049376 A1 * | 3/2004 | Sperschneider et al. | 704/200.1 |
| 2004/0252907 A1 | 12/2004 | Ito | |
| 2005/0008251 A1 | 1/2005 | Chiang | |
| 2005/0091051 A1 * | 4/2005 | Moriya et al. | 704/229 |
| 2005/0123214 A1 | 6/2005 | Takahira | |
| 2006/0239361 A1 | 10/2006 | Iguchi et al. | |
| 2006/0285766 A1 | 12/2006 | Ali | |
| 2006/0285767 A1 | 12/2006 | Ali | |
| 2007/0019114 A1 | 1/2007 | De Garrido et al. | |
| 2007/0140387 A1 | 6/2007 | Wong et al. | |
| 2007/0147478 A1 | 6/2007 | Lai et al. | |
| 2007/0160301 A1 | 7/2007 | Wang et al. | |
| 2007/0269137 A1 | 11/2007 | Ida et al. | |
| 2007/0296614 A1 * | 12/2007 | Lee et al. | 341/50 |
| 2008/0050032 A1 | 2/2008 | Okuno et al. | |
| 2008/0199101 A1 | 8/2008 | Sumiya et al. | |
| 2009/0060373 A1 | 3/2009 | Perera et al. | |
| 2010/0119176 A1 | 5/2010 | Ichihashi et al. | |
| 2010/0214433 A1 | 8/2010 | Takahashi | |
| 2011/0279730 A1 | 11/2011 | Goshi | |
| 2012/0070098 A1 | 3/2012 | Gohshi | |
| 2012/0081198 A1 | 4/2012 | Gohshi | |
| 2012/0207226 A1 * | 8/2012 | Gohshi | 375/240.25 |
| 2012/0314968 A1 * | 12/2012 | Gohshi | 382/263 |
| 2013/0176495 A1 * | 7/2013 | Gohshi | 348/629 |

FOREIGN PATENT DOCUMENTS

| | | |
|---|---|---|
| GB | 2 203 013 | 10/1988 |
| JP | 4-219089 | 8/1992 |
| JP | 07184085 A | 7/1995 |
| JP | 07-312704 | 11/1995 |
| JP | 8-139969 A | 5/1996 |
| JP | 09-205652 | 8/1997 |
| JP | 9-233489 A | 9/1997 |
| JP | 09-307897 | 11/1997 |
| JP | 09-319869 | 12/1997 |
| JP | 11-66311 | 3/1999 |
| JP | 11-196419 | 7/1999 |
| JP | 11-340878 | 12/1999 |
| JP | 11-345331 | 12/1999 |
| JP | 2001-169116 | 6/2001 |
| JP | 2002-125200 A | 4/2002 |
| JP | 2002-335527 A | 11/2002 |
| JP | 2003069859 A | 3/2003 |
| JP | 2003-101774 | 4/2003 |
| JP | 2003-134352 | 5/2003 |
| JP | 2003198878 A | 7/2003 |
| JP | 2003-283835 | 10/2003 |
| JP | 2005-117549 | 4/2005 |
| JP | 2005-191895 | 7/2005 |
| JP | 2006-157584 | 6/2006 |
| JP | 2006-304352 | 11/2006 |
| JP | 2006-310934 | 11/2006 |
| JP | 2007-514362 | 5/2007 |
| JP | 2007-174637 | 7/2007 |
| JP | 2007-265122 | 10/2007 |
| JP | 2007-310837 | 11/2007 |
| JP | 2008-103785 | 5/2008 |
| JP | 2009-198935 | 9/2009 |
| WO | WO 98/35449 | 8/1998 |
| WO | WO 00/42778 | 7/2000 |
| WO | WO 02/084997 | 10/2002 |
| WO | WO 2007/078829 | 7/2007 |
| WO | WO 2010/113342 | 10/2010 |
| WO | WO-2010113342 A1 | 10/2010 |
| WO | WO-2010140281 A1 | 12/2010 |
| WO | WO-2010146728 A1 | 12/2010 |
| WO | WO 2011/061957 | 5/2011 |

OTHER PUBLICATIONS

Matsumoto, N. et al., "A study on One Frame Reconstruction-based Super-resolution Using Image Segmentation," IEICE technical report, The Institute of Electronics, Information and Communication Engineers (IEICE), vol. 108(4), IE 2008-6, pp. 31-36, Apr. 2008 (English Abstract).

Aoki Shingo et al., "Wavelet transform coding by zero value tree structure and vector quantization," Picture Coding Symposium of Japan, Proceedings of the 16$^{th}$ Symposium, pp. 95 and 96, Nov. 14, 2001 (English Abstract).

Vese, L.A. et al., "Modeling textures with total variation minimization and oscillating patterns in image processing," Journal of Scientific Computing, vol. 19, Nos. 1-3, Dec. 2003.

English Version of International Search Report dated Dec. 20, 2011 (PCT/JP2011/071706).

English Version of International Search Report dated Apr. 6, 2010 (PCT/JP2010/000372).

English Version of International Search Report and Written Opinion dated Mar. 9, 2010 (PCT/JP2010/000299).

English Version of International Search Report dated Dec. 7, 2010 (PCT/JP2010/069841).

U.S. Restriction Requirement for corresponding U.S. Appl. No. 13/138,197 mailed Oct. 10, 2012.

U.S. Office Action for corresponding U.S. Appl. No. 13/138,197 mailed Dec. 6, 2012.

U.S. Notice of Allowance for corresponding U.S. Appl. No. 13/138,197 mailed Apr. 3, 2013.

U.S. Office Action for corresponding U.S. Appl. No. 13/823,299 mailed Jan. 21, 2014.

U.S. Notice of Allowance for corresponding U.S. Appl. No. 13/377,907 mailed Jan. 18, 2013.

U.S. Office Action for corresponding U.S. Appl. No. 13/375,251 mailed Jun. 19, 2013.

U.S. Notice of Allowance for corresponding U.S. Appl. No. 13/375,251 mailed Oct. 3, 2013.

U.S. Office Action for corresponding U.S. Appl. No. 13/504,796 mailed Dec. 16, 2013.

International Search Report dated Aug. 10, 2010.

U.S. Notice of Allowance for corresponding U.S. Appl. No. 13/823,299 mailed Mar. 12, 2014.

U.S. Notice of Allowance for corresponding U.S. Appl. No. 13/504,796 mailed Mar. 12, 2014.

U.S. Office Action for corresponding U.S. Appl. No. 13/577,953 mailed Jun. 2, 2014.

* cited by examiner

F I G. 2
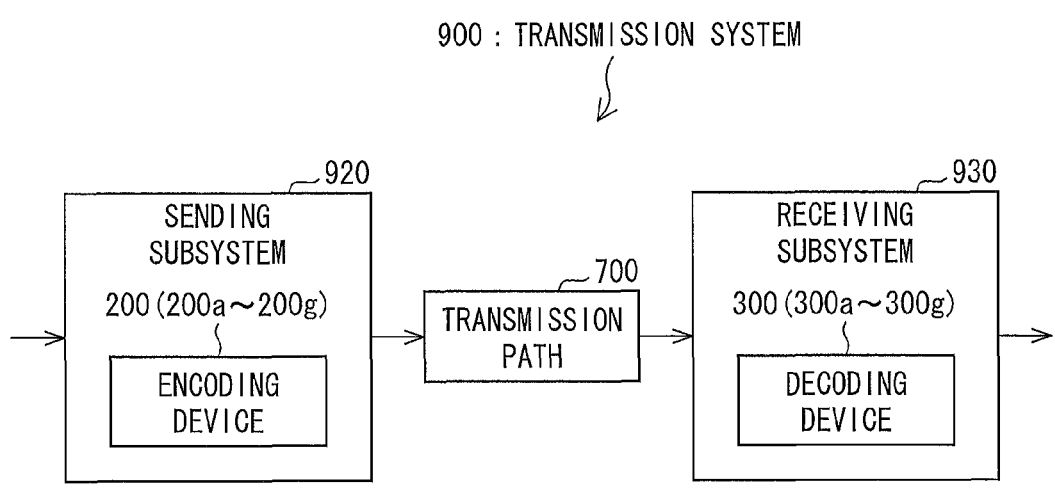

F I G. 6
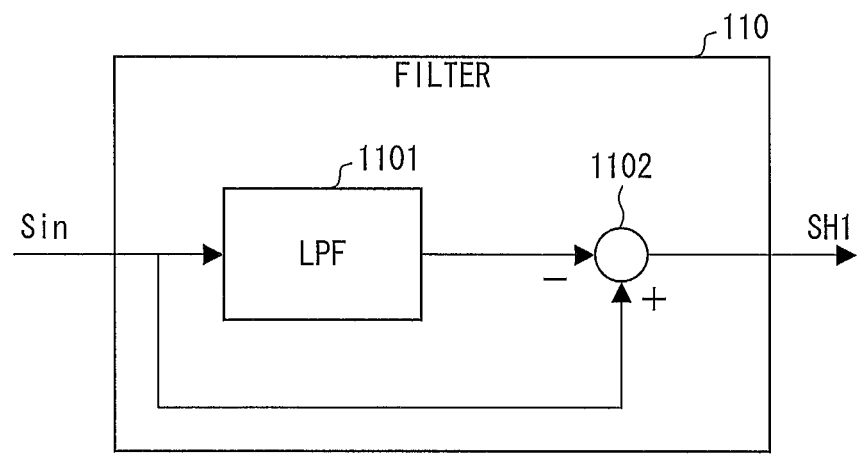

F I G. 1 2
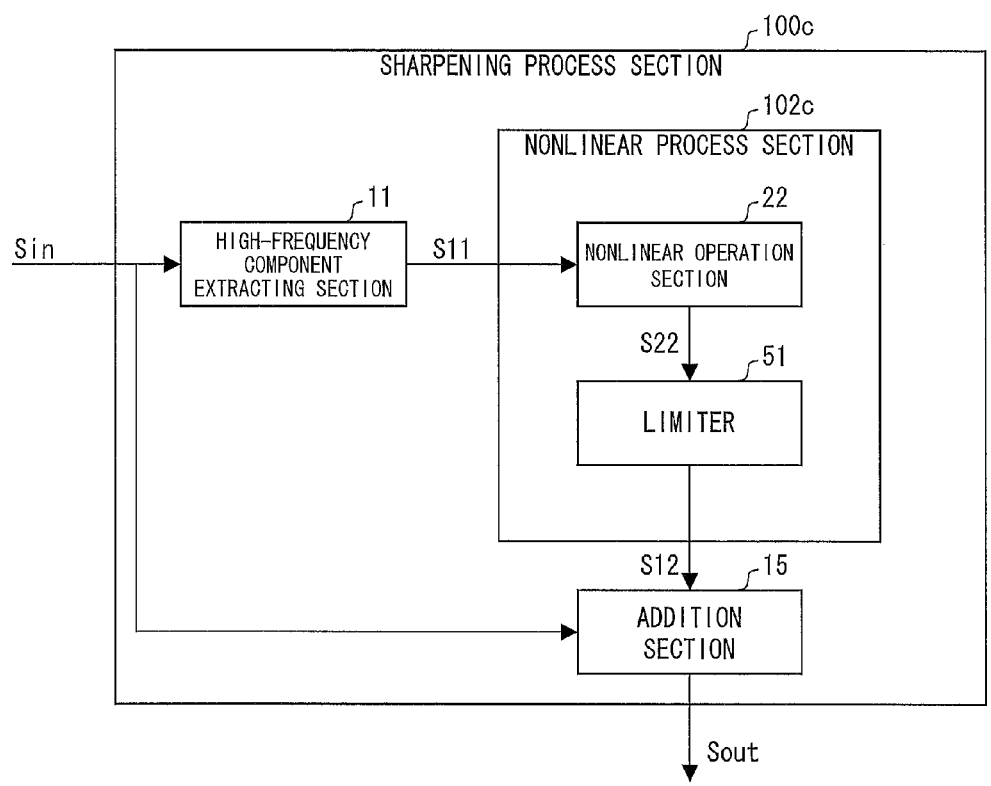

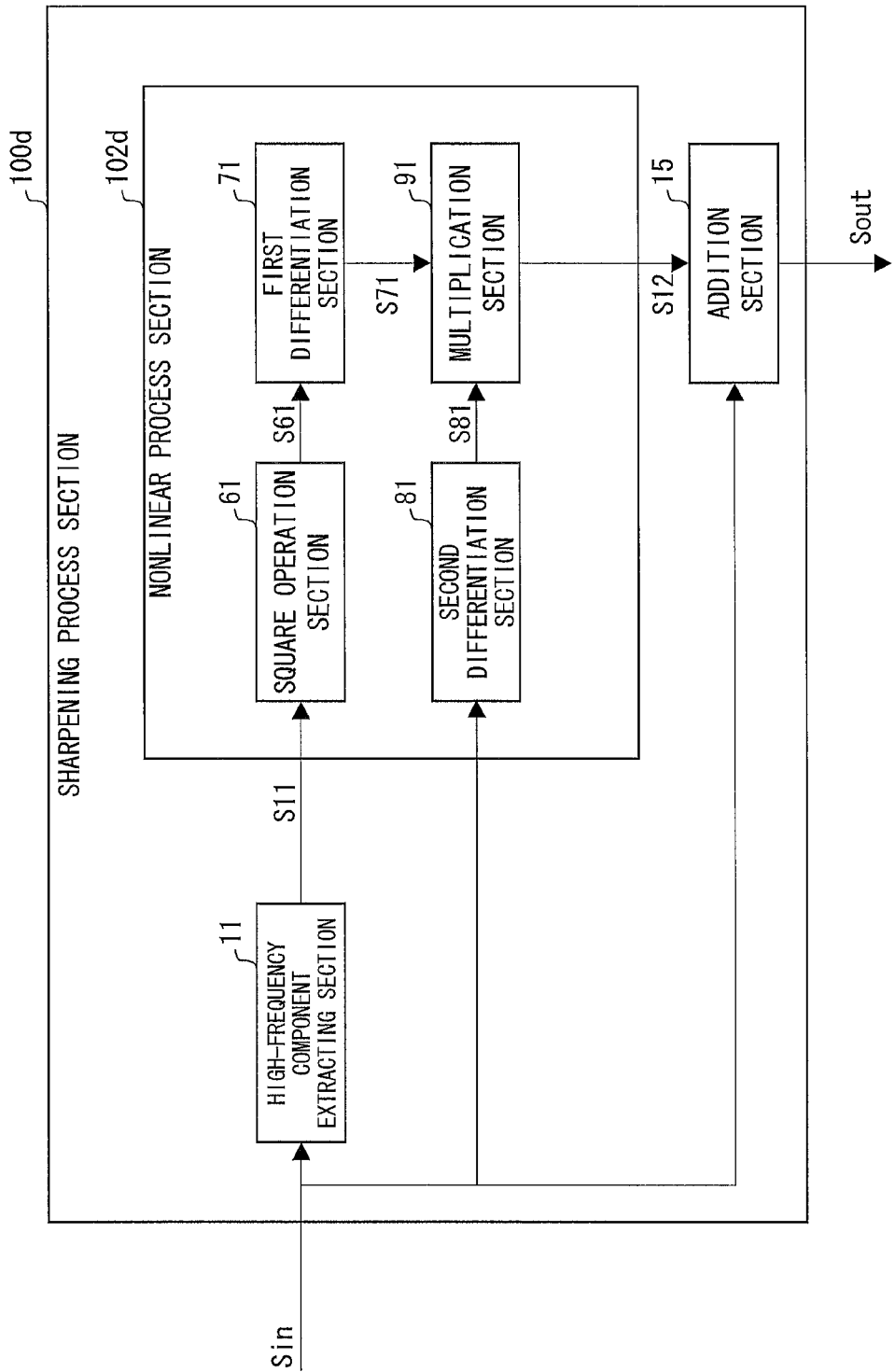
F I G . 1 4

F I G. 1 6
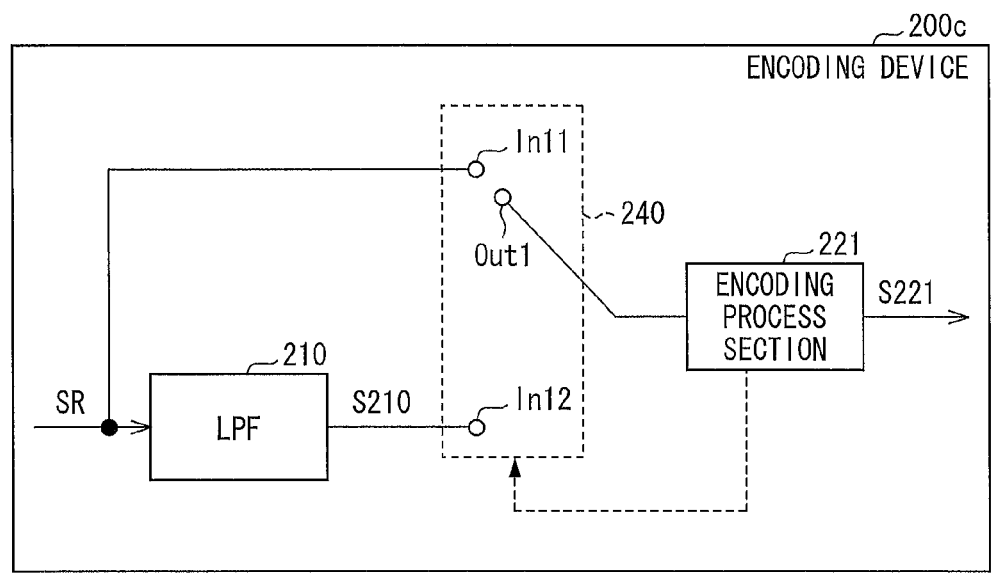

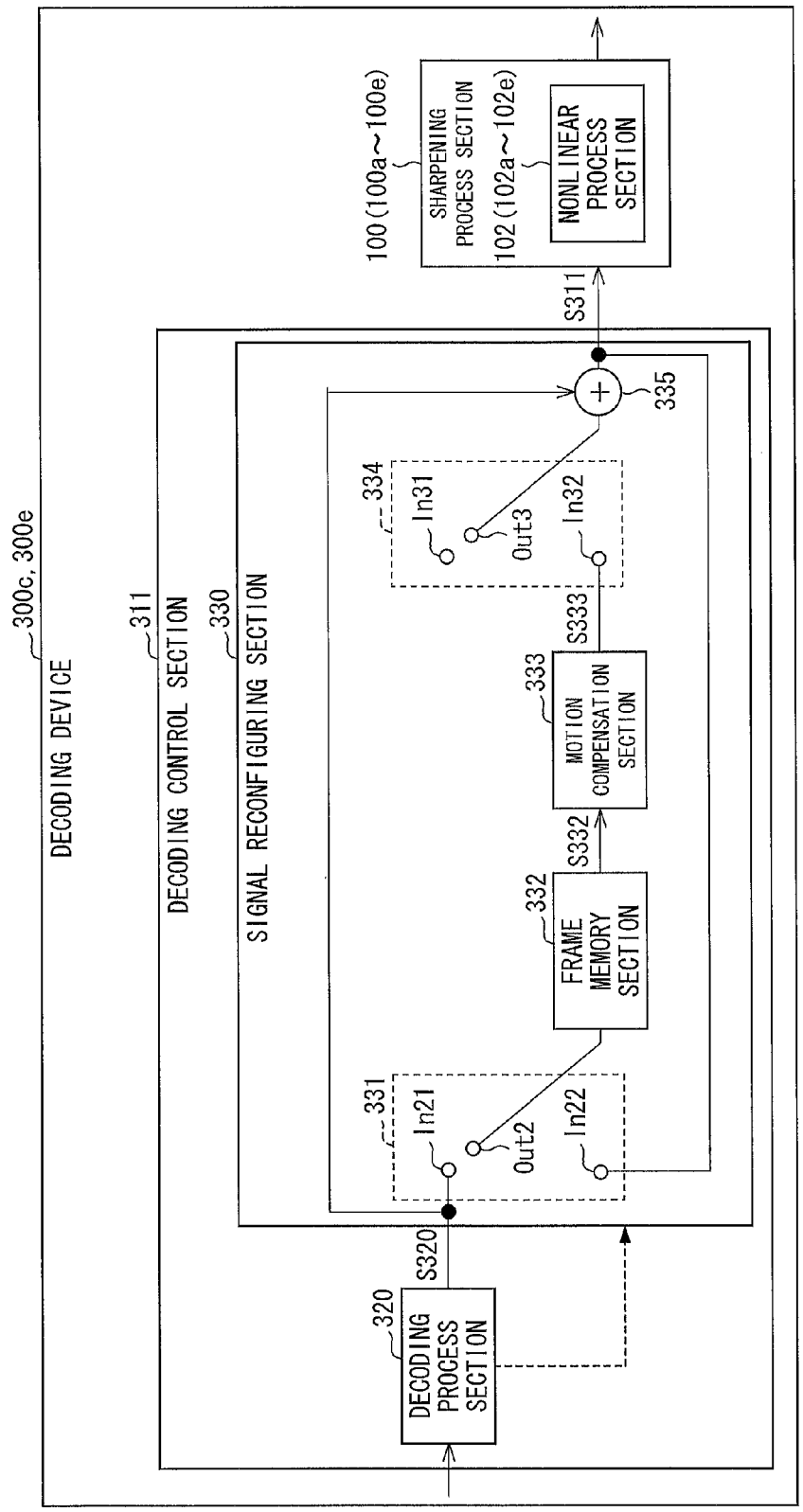

F I G. 2 0
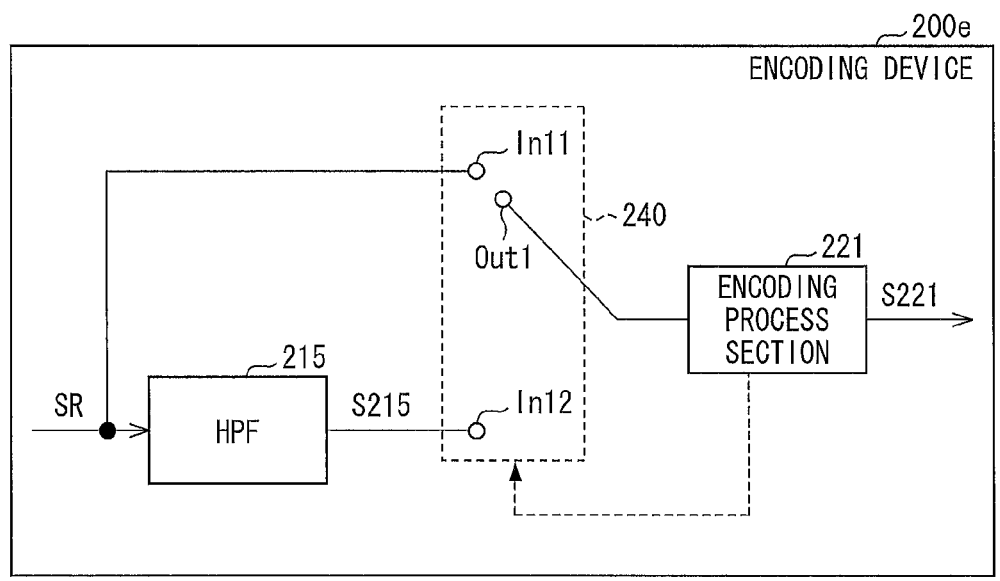

DECODING DEVICE WITH NONLINEAR PROCESS SECTION, CONTROL METHOD FOR THE DECODING DEVICE, TRANSMISSION SYSTEM, AND COMPUTER-READABLE RECORDING MEDIUM HAVING A CONTROL PROGRAM RECORDED THEREON

TECHNICAL FIELD

The present invention relates to a decoding device that decodes an encoded signal, a control method for a decoding device, a transmission system, and a computer-readable recording medium on which a control program is recorded.

BACKGROUND ART

With the recent spread of the Internet, portable phones, digital broadcast and the like, digital communication that transmits and receives multimedia contents such as images and audio are widely available. Since the multimedia contents consists of information being large in amount, a technique to reduce this information amount by encoding (compression encoding) the contents has been commonly used, in order to minimize a transmission bit rate. For example, MPEG (Moving Picture Experts Group)-2 and H.264 have been commonly used as an encoding system for video images.

Such an encoding method employs lossy encoding in which encoding is performed by use of human visual and auditory senses and information difficult for a human to recognize is deleted. Hence, a decoded signal thereof would not be a complete reproduction of an original signal prior to the encoding. Accordingly, the images and sounds indicated by the decoded signal become slightly deteriorated than the images and sounds of the original signal prior to the encoding.

There has been known techniques, which minimize deterioration of a decoded signal while maintaining the degree that the information amount is reduced by the encoding. For example, Patent Literature 1 discloses an encoding technique that optimizes image quality while maintaining a low bit rate, by having quantization be made great in a sector of a video frame in which noise and the like is not easily visualized by a human, whereas having the quantization be made small in a sector of a video frame in which noise and the like can easily be visualized by a human.

Moreover, Patent Literature 2 discloses a technique in which a border reinforcement process of a signal is carried out in a digital broadcast receiver, which signal is indicative of a video image which has been subjected to decoding.

CITATION LIST

Patent Literature

Patent Literature 1
Japanese Patent Application Publication, Tokukai No. 2002-335527 A (Publication Date: Nov. 22, 2002)
Patent Literature 2
Japanese Patent Application Publication, Tokukai No. 2002-125200 A (Publication Date: Apr. 26, 2002)

SUMMARY OF INVENTION

Technical Problem

By including not enough high-frequency components in the decoded signal, this results in having an unsharp image or audio indicated by the decoded signal. In a case of an image for example, the image becomes blurred or has a lower resolution.

Unless a high-frequency component included in an original signal is encoded, the conventional technique such as Patent Literature 1 is not capable of reconstructing the high-frequency component in a decoded signal. Hence, in order to include the high-frequency component in the decoded signal, the original signal needs to be encoded in such a manner that the least possible amount of the high-frequency component is eliminated from the original signal. However, this serves as a cause for an increase in the transmission bit rate of the encoded signal.

On the other hand, in a case in which a sharpening process is carried out to a decoded signal based on a conventional technique such as Patent Literature 2, sharpening can be expected to a certain degree. However, since the sharpening process carried out by the conventional technique is based on linear operation, a high-frequency band that exceeds the Nyquist frequency cannot be compensated. Hence, there is the problem that image and audio that are indicated by a decoded signal cannot be highly sharpened.

The present invention is accomplished in view of the foregoing problem, and an object thereof is to provide a decoding device and like device that allows for highly sharpening contents indicated by a signal that has been subjected to decoding.

Solution to Problem

In order to attain the object, a decoding device according to the present invention is a decoding device that outputs an output signal by receiving, as an input, an encoded signal including a signal in which an original signal is encoded, the original signal being indicative of contents of at least one of image and audio, and the output signal being indicative of the contents, the decoding device including: decoding means for decoding the encoded signal, to generate a decoded signal; low-frequency component removing means for removing, from frequency components of the decoded signal, a low-frequency component at least including a direct current component, to generate a low-frequency-free signal; nonlinear processing means for generating a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0; and addition means for adding the nonlinear process signal to the decoded signal, to generate an addition signal, the addition signal being outputted as the output signal.

Moreover, a control method according to the present invention for a decoding device is a method of controlling a decoding device that outputs an output signal by receiving, as an input, an encoded signal including a signal in which an original signal is encoded, the original signal being indicative of contents of at least one of image and audio, the method including: decoding the encoded signal, to generate a decoded signal; removing, from frequency components of the decoded signal, a low-frequency component at least including a direct current component, to generate a low-frequency-free signal; generating a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0; and adding the nonlinear process signal to the decoded signal, to generate an addition signal, the addition signal being outputted as the output signal.

According to the configuration, a decoded signal is generated by decoding an encoded signal that includes a signal in which an original signal is encoded, and a low-frequency-free signal is generated by removing at least a direct current component of frequency components included in the generated decoded signal, from the signal input. Thereafter, a nonlinear process signal is generated, (i) in which positive and negative signs of the low-frequency-free signal are retained and (ii) which broadly monotonically increases nonlinearly with respect to the low-frequency-free signal when values of the low-frequency-free signal are at least in the vicinity of 0. Further, the nonlinear process signal is added to the decoded signal, to be outputted as an output signal.

Accordingly, it is possible to output, as an output signal, a signal in which a nonlinear process is carried out to the low-frequency-free signal in the decoded signal.

In this case, the output signal is generated by, for example, adding (a) the decoded signal to (b) a nonlinear process signal to which a nonlinear process has been carried out, such as squaring the low-frequency-free signal. However, the positive and negative signs of the low-frequency-free signal are retained as the positive and negative signs of the output signal.

As such, the output signal includes a high-frequency component that is not included in the frequency components of the decoded signal. As a result, the output signal includes a frequency component higher than a Nyquist frequency, which Nyquist frequency is a half a sampling frequency when the decoded signal is made discrete.

Hence, the decoding device according to the present invention can make a rise and fall of a signal corresponding to an edge part included in the decoded signal to be steep. In particular, the decoding device is capable of making the rise and fall of the signal corresponding to the edge part be more highly sharp as compared to a sharpening process in which a linear operation is carried out.

As a result, the decoding device according to the present invention allows for highly sharpening contents indicated by the decoded signal. In particular, in a case in which the decoded signal is indicative of an image, the rise and fall of the signal corresponding to an outline part (edge) included in the image is made sharper. This allows for highly sharpening the image, improving blur in the image, and improving resolution of the image. The contents is similarly sharpened also in a case in which the decoded signal is indicative of audio, whereby sound quality thereof is made clearer.

Furthermore, as described above, it is possible to include in the decoded signal a frequency component higher than the Nyquist frequency. Hence, in encoding the original signal, it is possible to encode the original signal upon reducing information amount of the original signal in advance. More specifically, for example, when encoding a signal, it is possible to encode a signal in which high-frequency components included in the original signal have been removed. This as a result attains such an effect that a transmission rate is reduced in a transmission path, in a case in which an encoded signal is transmitted from the encoding device to the decoding device. By reducing the transmission rate, it is possible to reduce costs required for the transmission (in particular, establishment costs and maintenance costs of the transmission path).

For a fuller understanding of the nature and advantages of the invention, reference should be made to the ensuing detailed description taken in conjunction with the accompanying drawings.

BRIEF DESCRIPTION OF DRAWINGS

FIG. 2 is a block diagram illustrating a transmission system including a decoding device according to the present invention.

FIG. 6 is a block diagram showing another configuration example of a filter included in the high-frequency component extracting section shown in FIG. 5.

Figure 4:
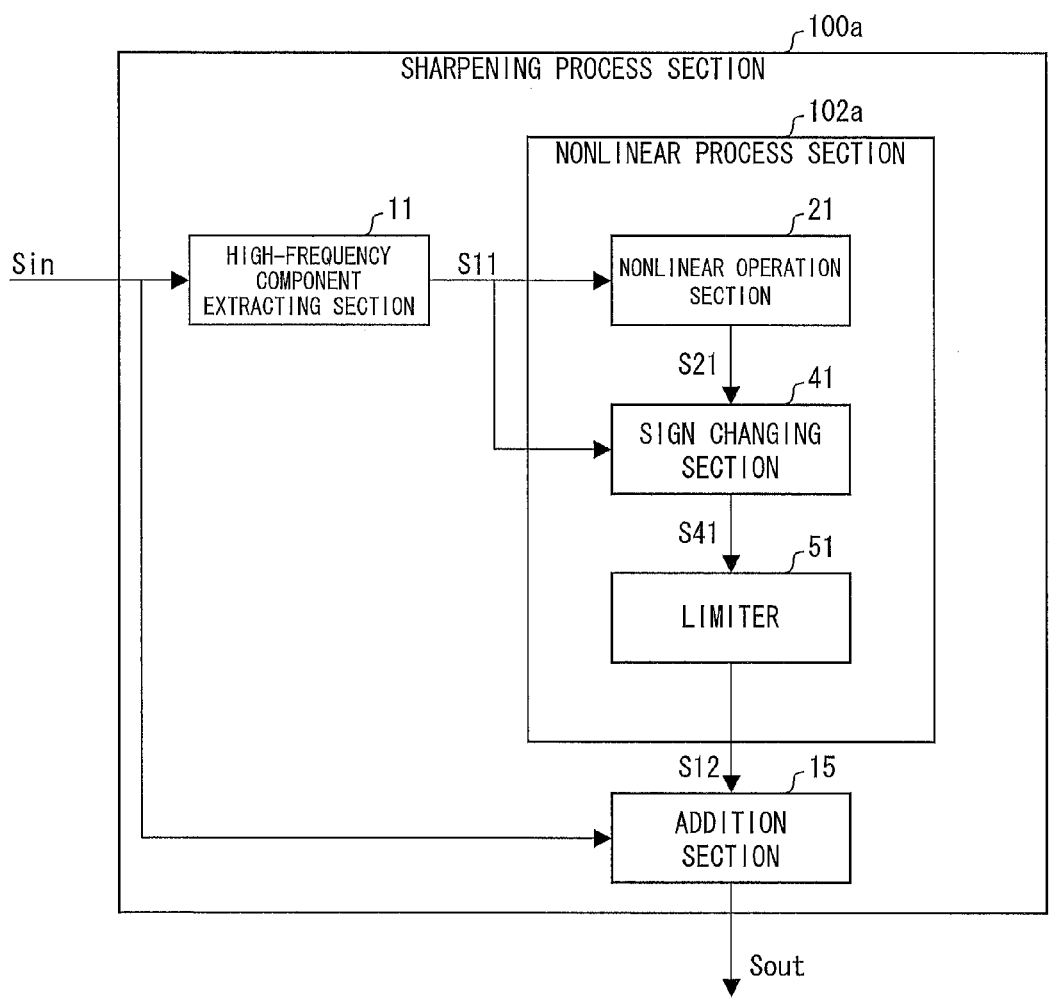
FIG. 4 is a block diagram showing a configuration of a sharpening process section according to the present invention.
Figure 7:
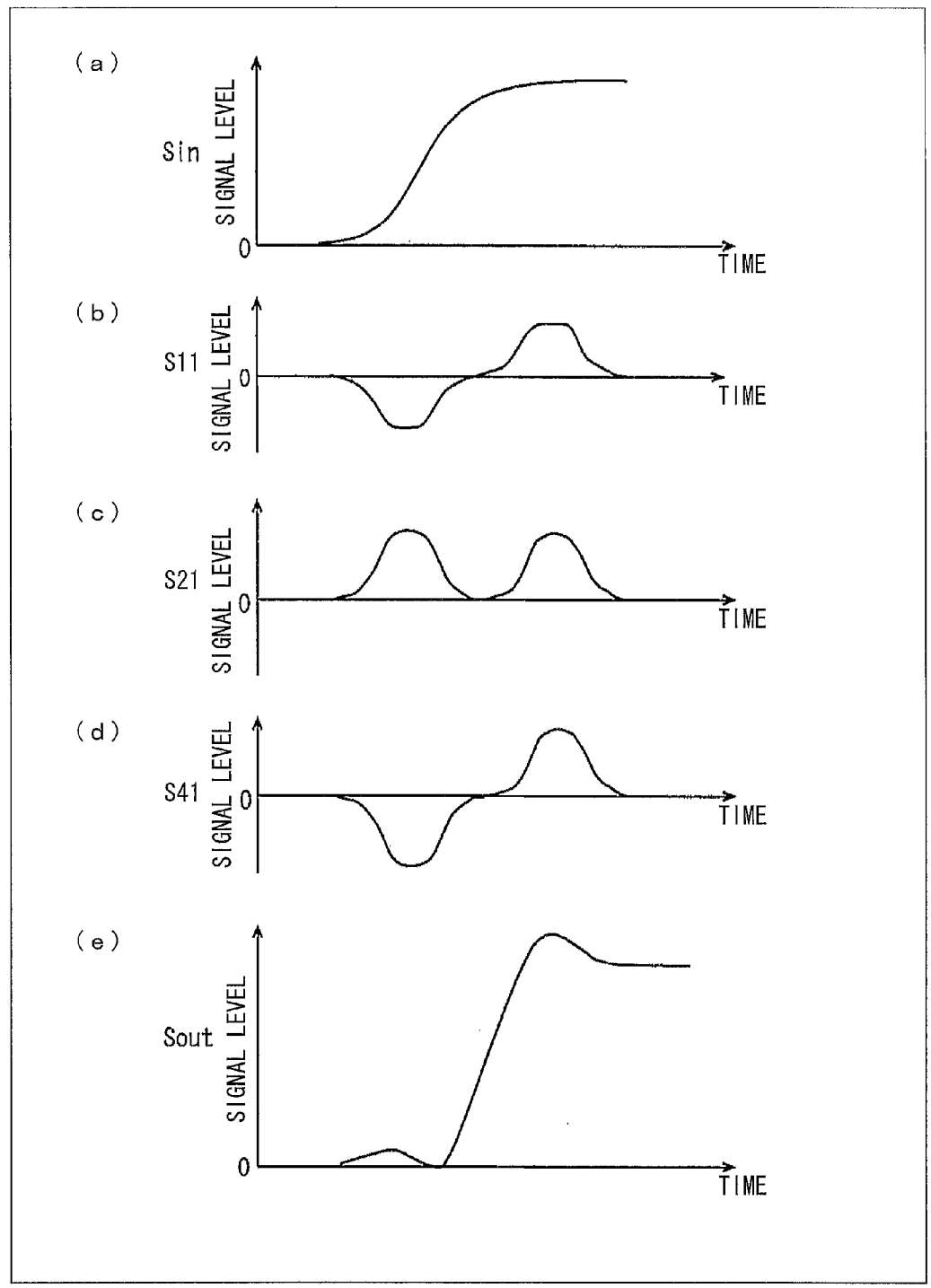
FIG. 7

(a) of FIG. 7 schematically shows a waveform of a signal inputted to the sharpening process section shown in FIG. 4. (b) of FIG. 7 schematically shows a waveform of a high-frequency signal generated by the sharpening process section shown in FIG. 4. (c) of FIG. 7 schematically shows a waveform of a nonlinear signal generated in the sharpening process section shown in FIG. 4. (d) of FIG. 7 schematically shows a waveform of a sign change signal generated in the sharpening process section shown in FIG. 4. (e) of FIG. 7 schematically shows a waveform of an output signal generated in the sharpening process section shown in FIG. 4.

FIG. 8

Figure 8:
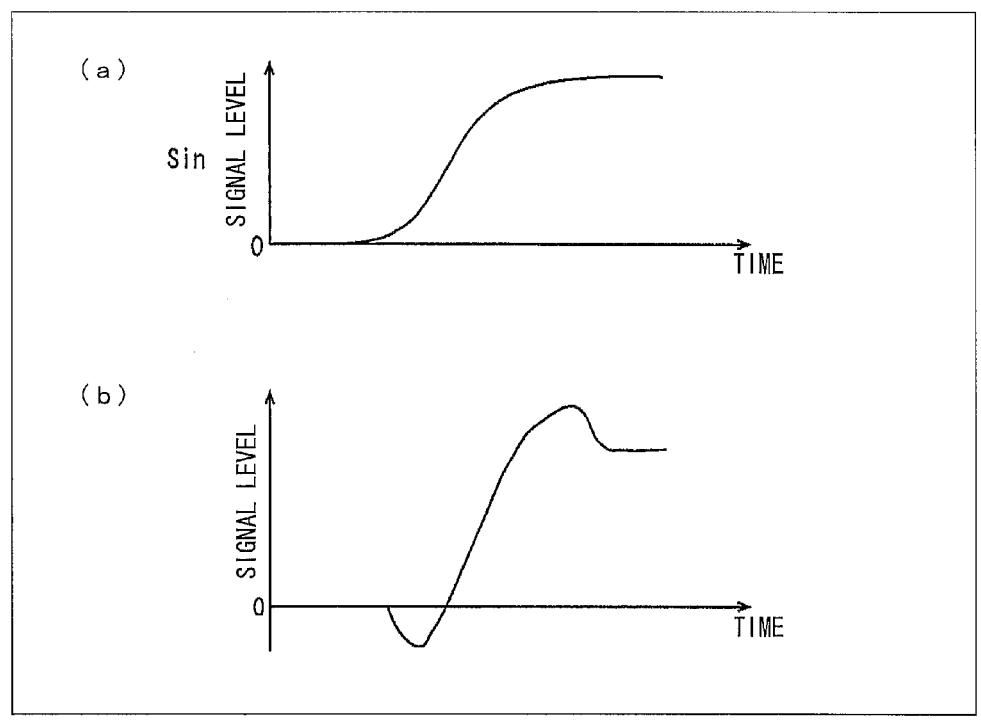

(a) of FIG. 8 is a drawing schematically showing a waveform of a signal inputted to the sharpening process section shown in FIG. 4. (b) of FIG. 8 is a drawing schematically showing a waveform obtained by enhancing, according to the conventional technique, the waveform of the signal shown in (a) of FIG. 8.

Figure 9:
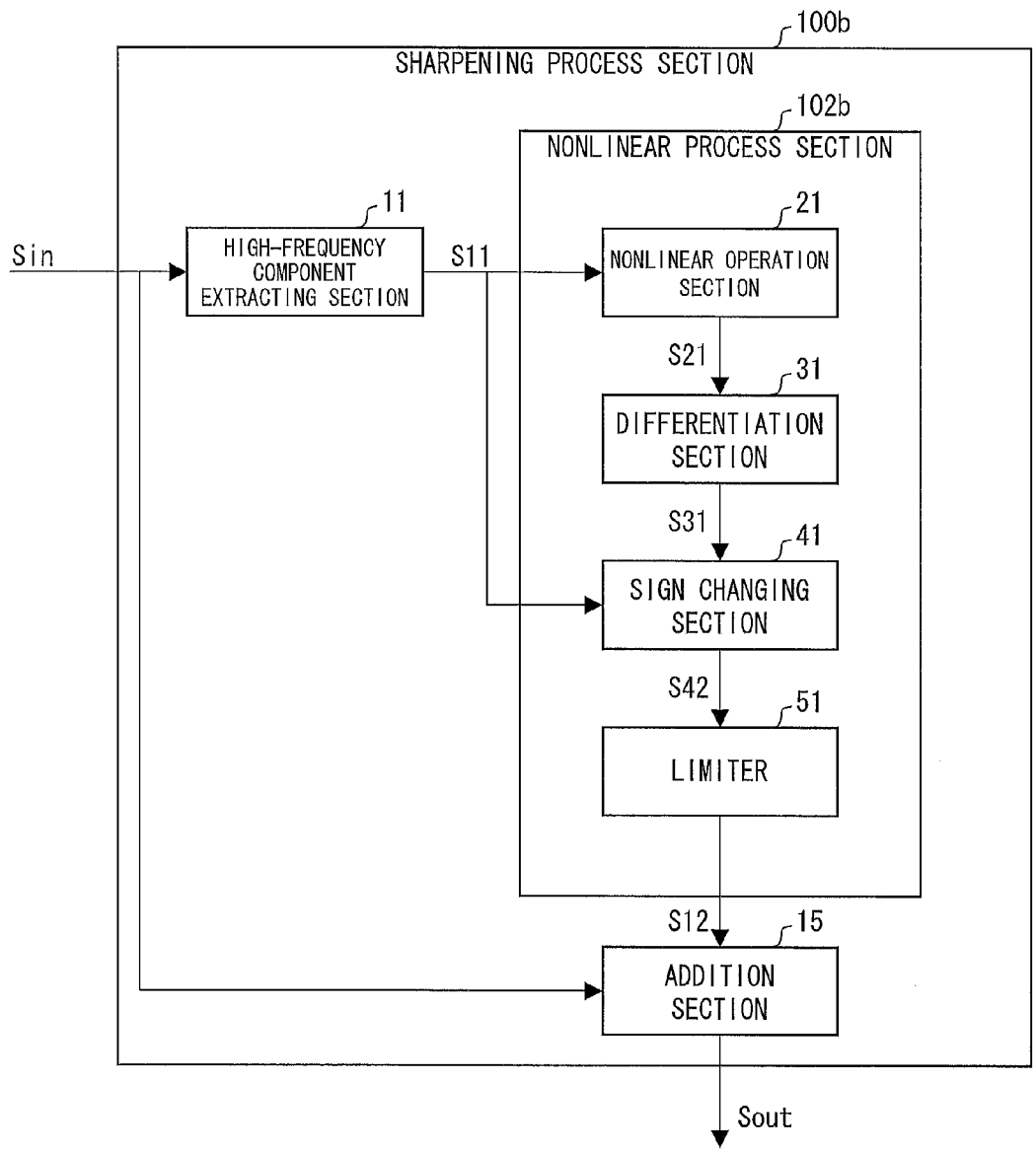

FIG. 9 is a block diagram showing another configuration of the sharpening process section according to the present invention.

Figure 10:
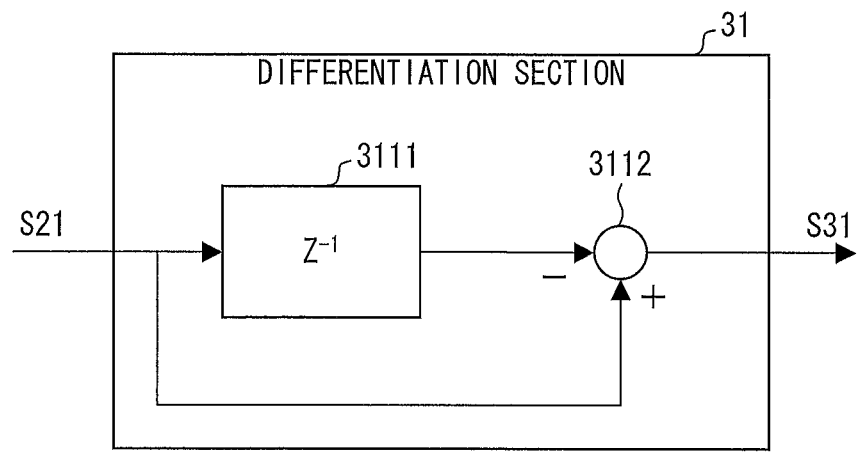

FIG. 10 is a block diagram showing a configuration of a differentiation section included in the sharpening process section shown in FIG. 9.

FIG. 11

Figure 11:
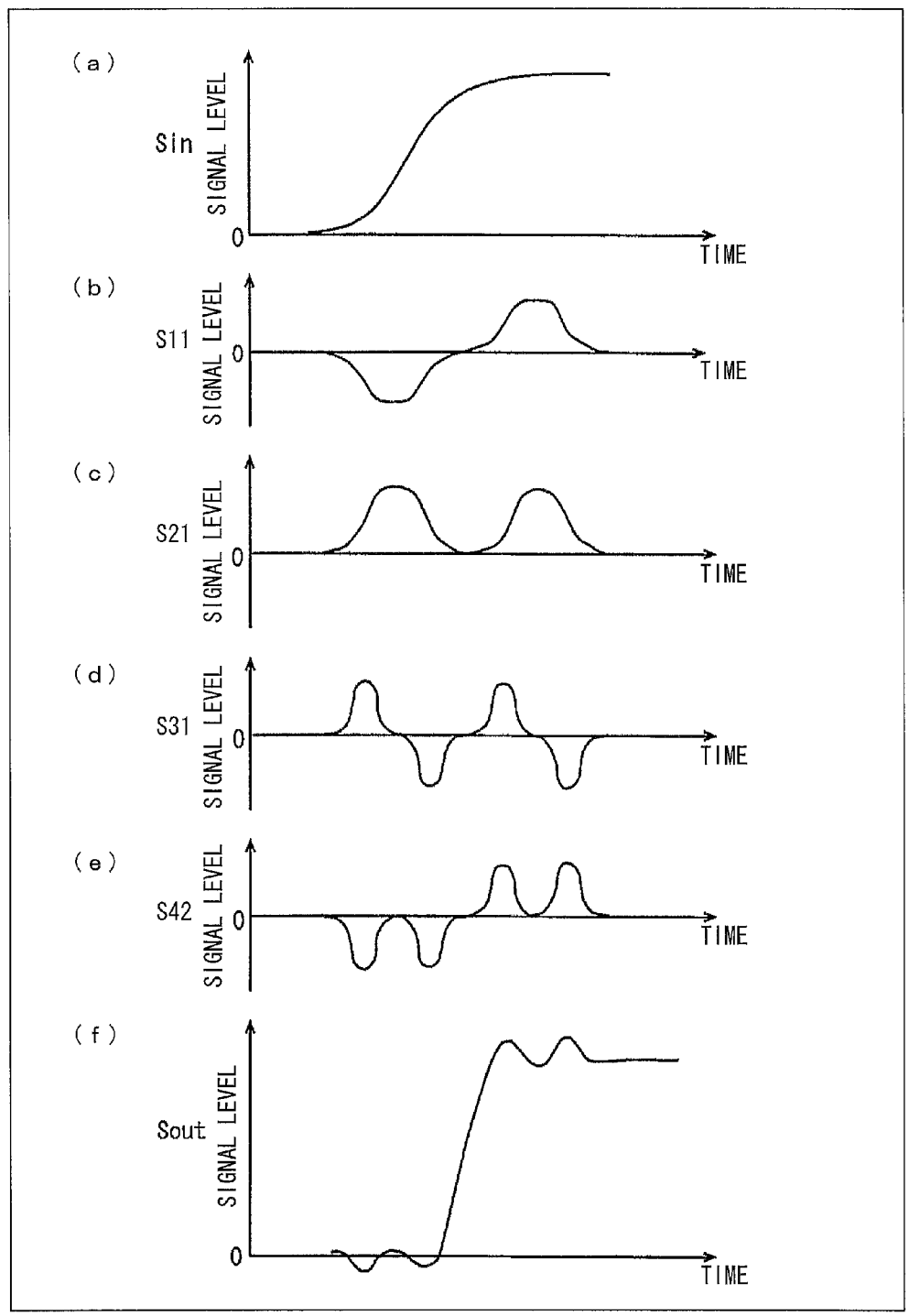

(a) of FIG. 11 schematically shows a waveform of a signal inputted to the sharpening process section shown in FIG. 9. (b) of FIG. 11 schematically shows a waveform of a high-frequency signal generated in the sharpening process section shown in FIG. 9. (c) of FIG. 11 schematically shows a waveform of a nonlinear signal generated in the sharpening process section shown in FIG. 9. (d) of FIG. 11 schematically shows a waveform of a differentiation signal generated in the sharpening process section shown in FIG. 9. (e) of FIG. 11 schematically shows a waveform of a sign change signal generated in the sharpening process section shown in FIG. 9. (f) of FIG. 11 schematically shows a waveform of an output signal generated in the sharpening process section shown in FIG. 9.

FIG. 12 is a block diagram showing yet another configuration of the sharpening process section according to the present invention.

FIG. 13

Figure 13:
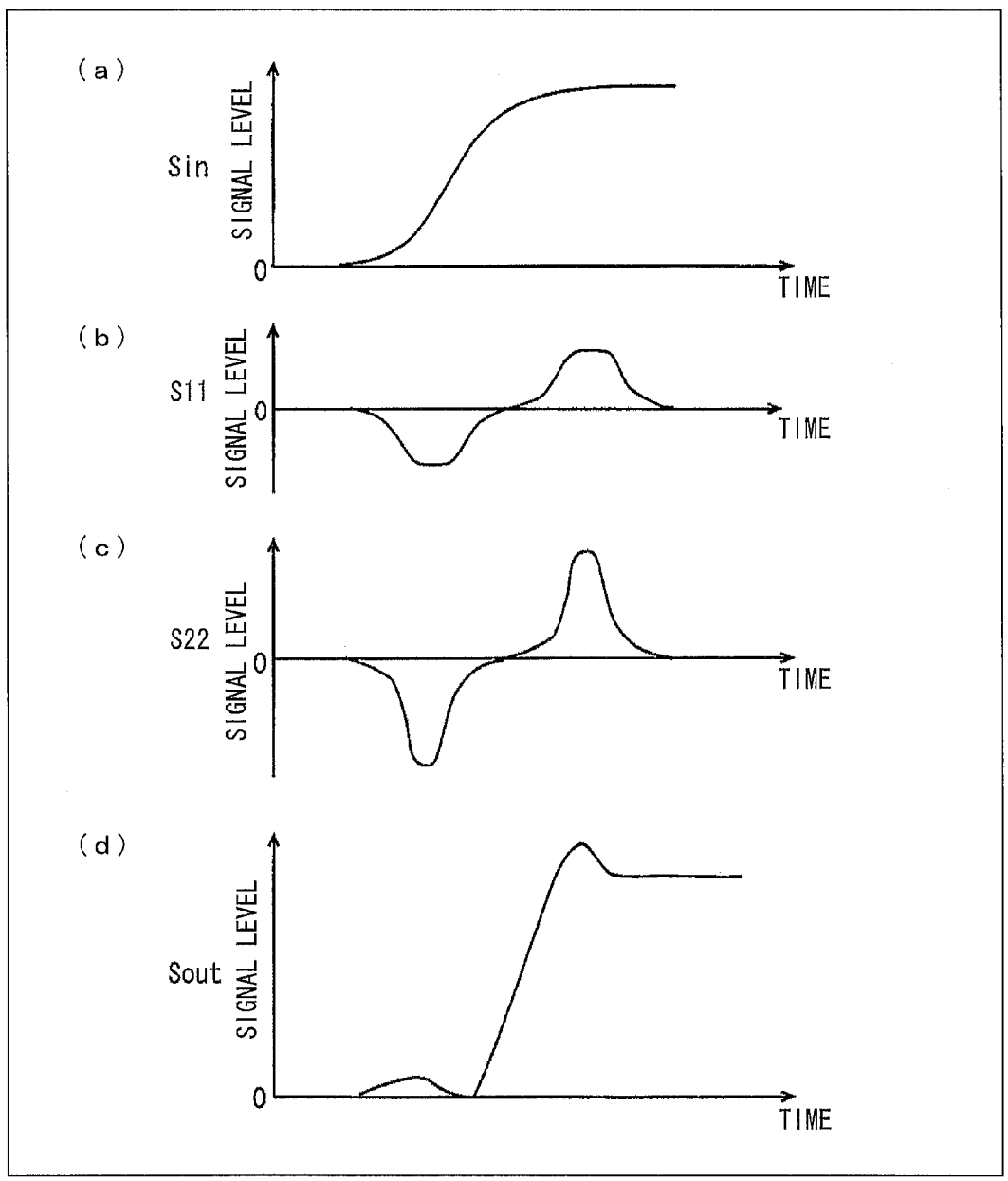

(a) of FIG. 13 schematically shows a waveform of a signal inputted to the sharpening process section shown in FIG. 12. (b) of FIG. 13 schematically shows a waveform of a high-frequency signal generated in the sharpening process section of FIG. 12. (c) of FIG. 13 schematically shows a waveform of a nonlinear signal generated in the sharpening process section shown in FIG. 12. (d) of FIG. 13 schematically shows a waveform of an output signal generated in the sharpening process section shown in FIG. 12.

FIG. 14 is a block diagram showing yet another configuration of sharpening process section of the present invention.

Figure 15:
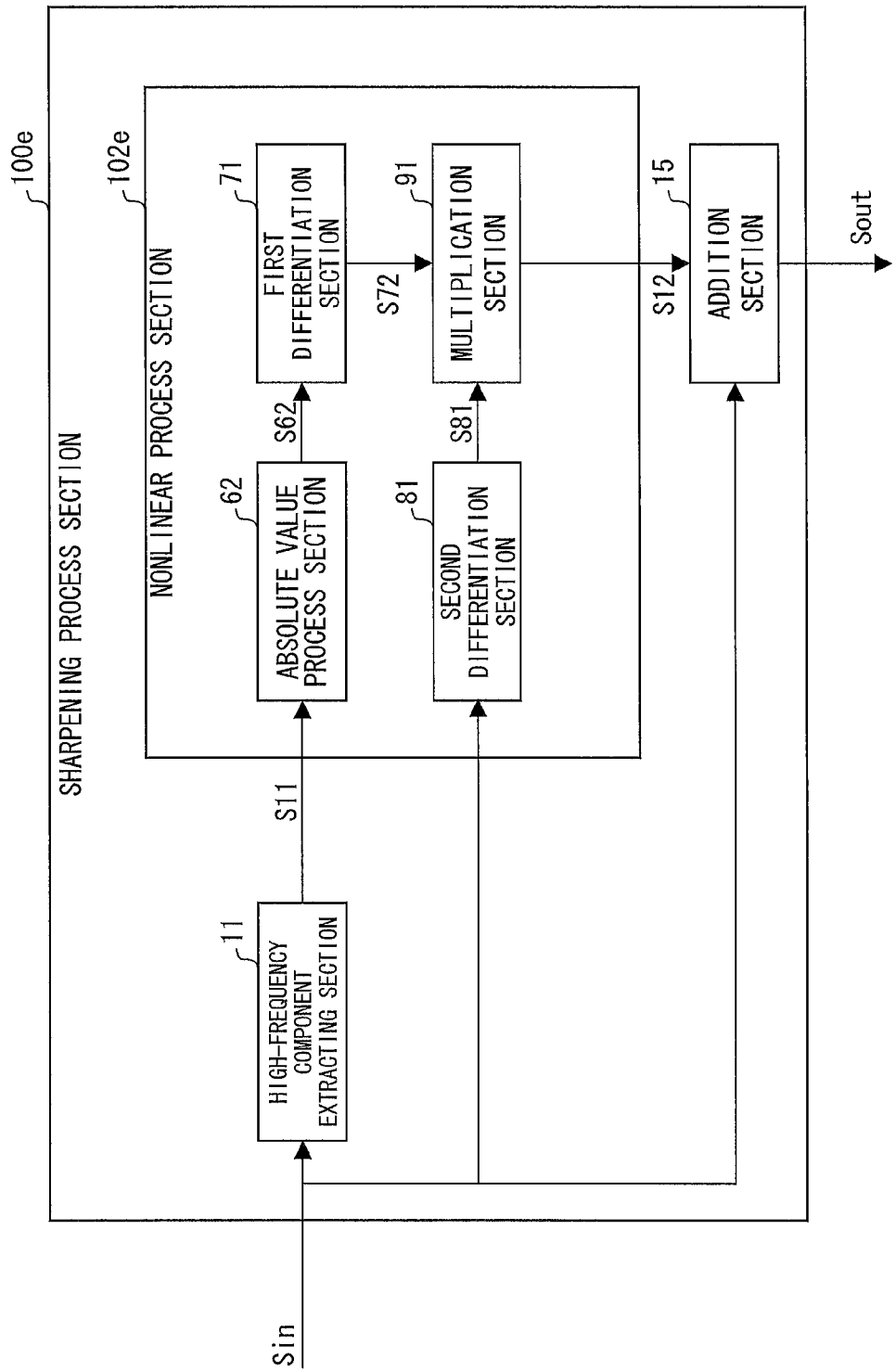

FIG. 15 is a block diagram showing yet another configuration of sharpening process section of the present invention.

FIG. 16 is a block diagram showing a configuration of an encoding device corresponding to the decoding device shown in FIG. 17.

FIG. 17 is a block diagram showing another configuration of a decoding device of the present invention.

Figure 18:
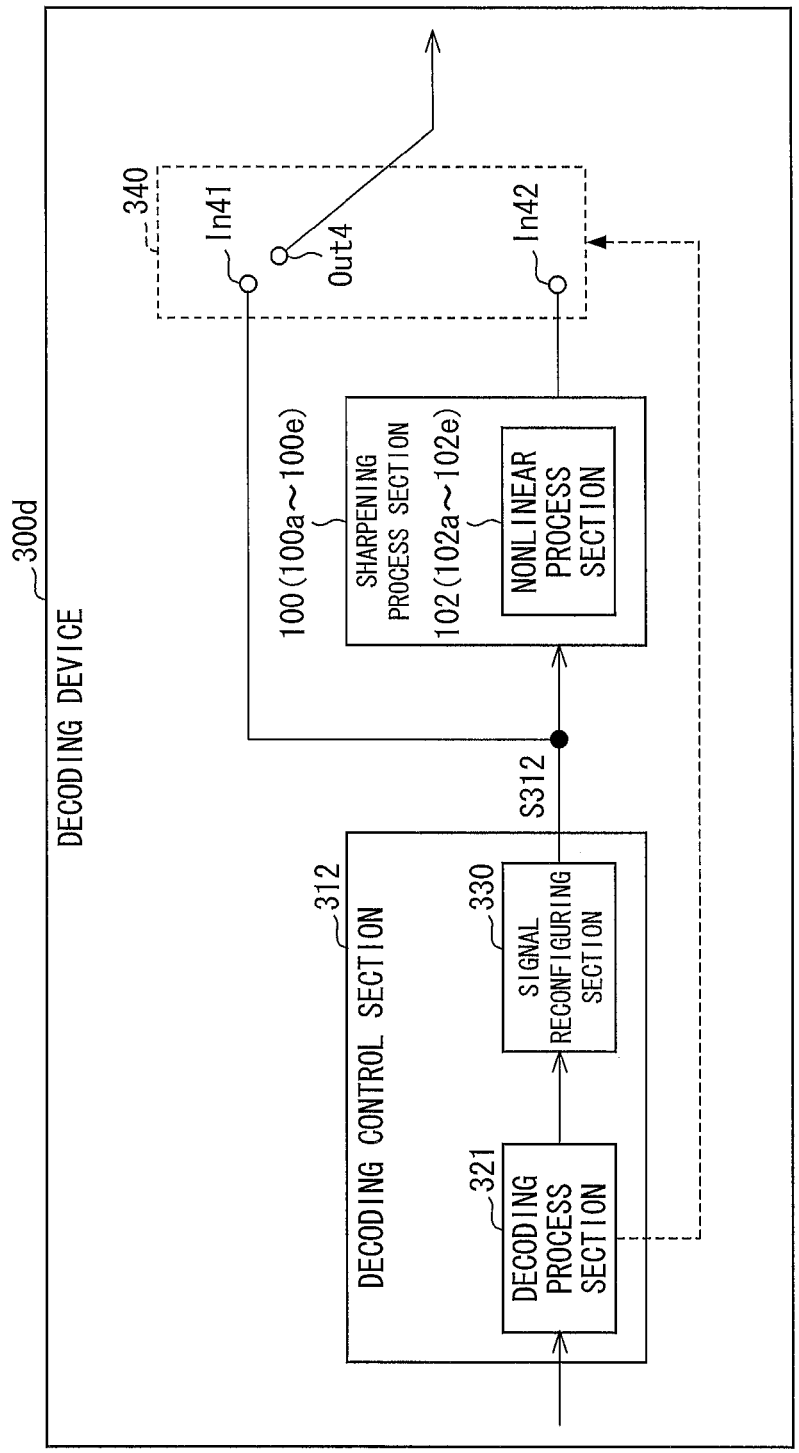

FIG. 18 is a block diagram showing a configuration example of a modification of the decoding device shown in FIG. 17.

Figure 19:
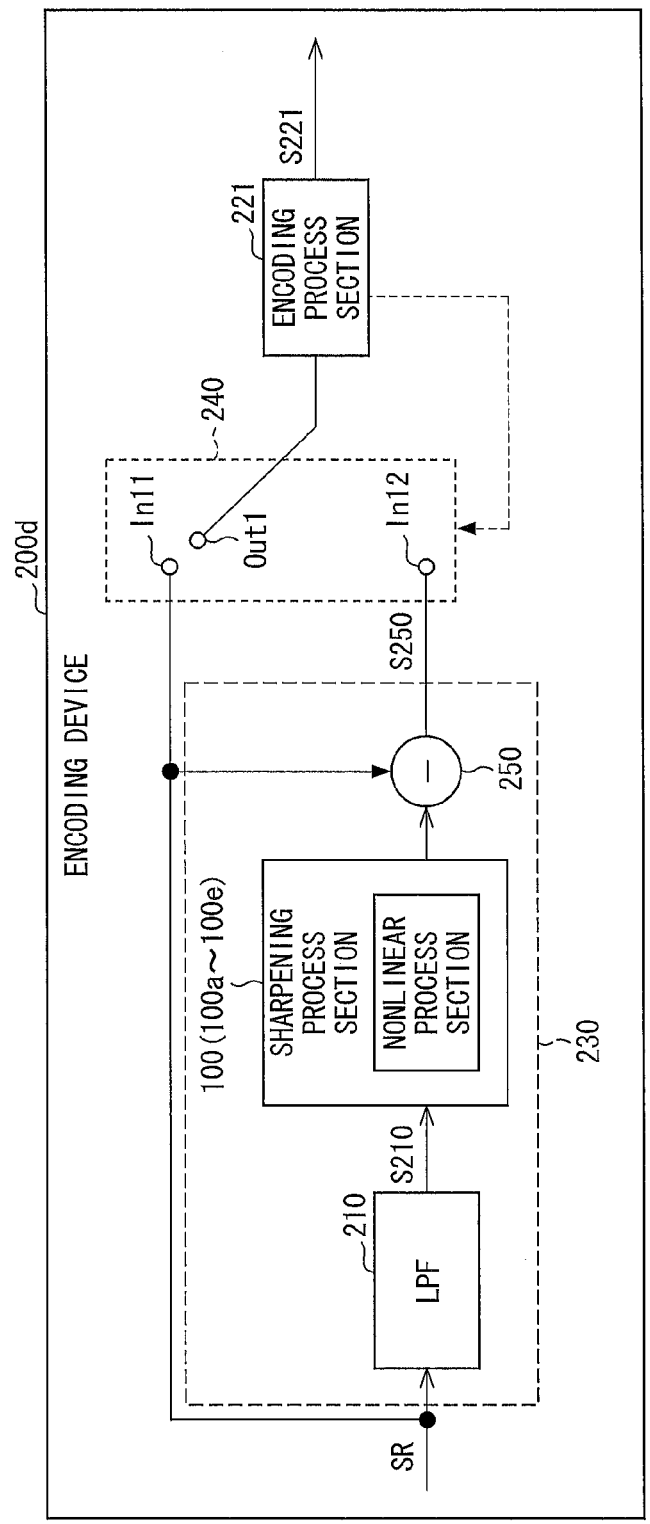

FIG. 19 is a block diagram showing another configuration of an encoding device corresponding to the decoding device shown in FIG. 17.

FIG. 20 is a block diagram showing a configuration example of a modification of the encoding device shown in FIG. 19.

Figure 21:
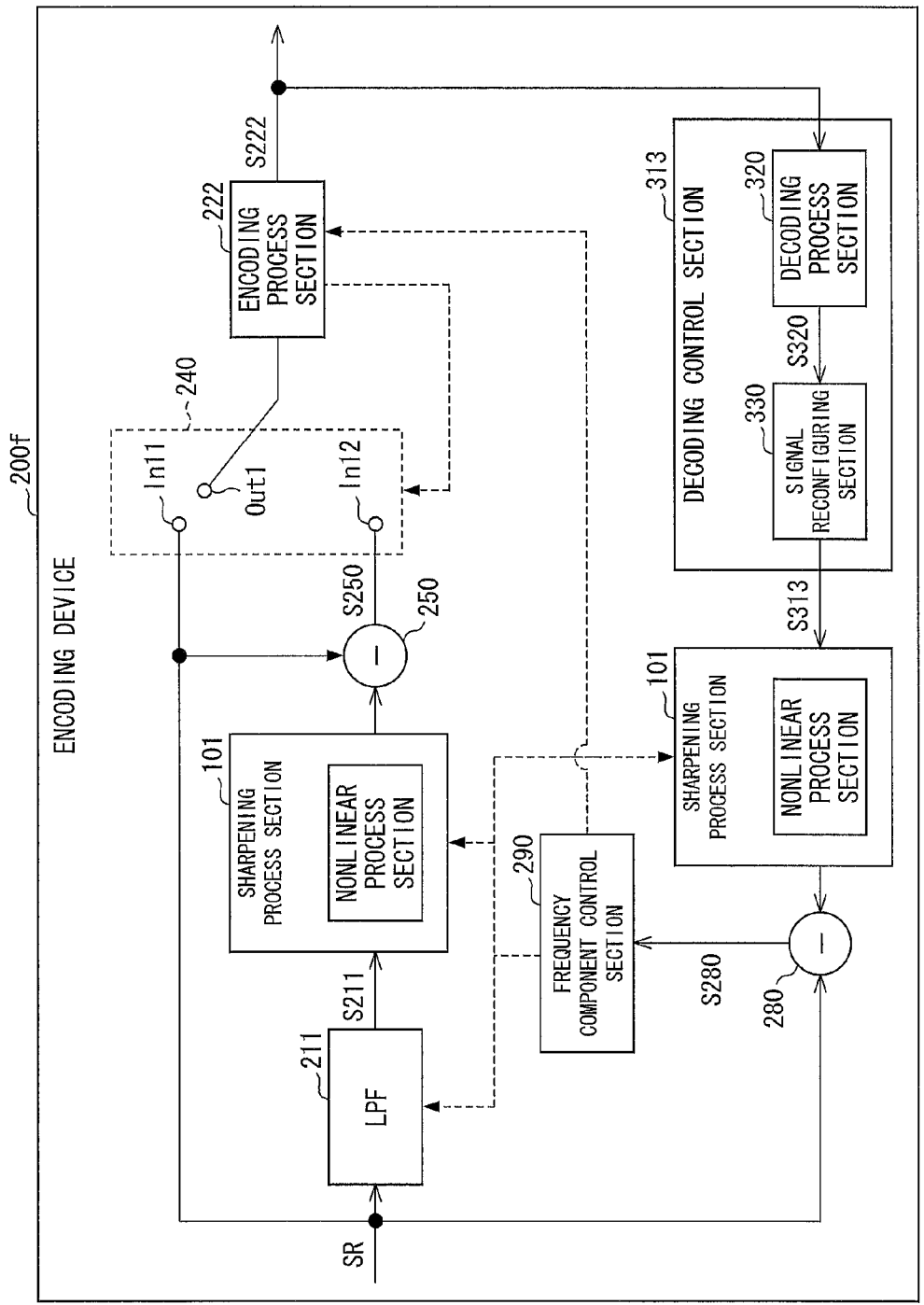
Figure 22:
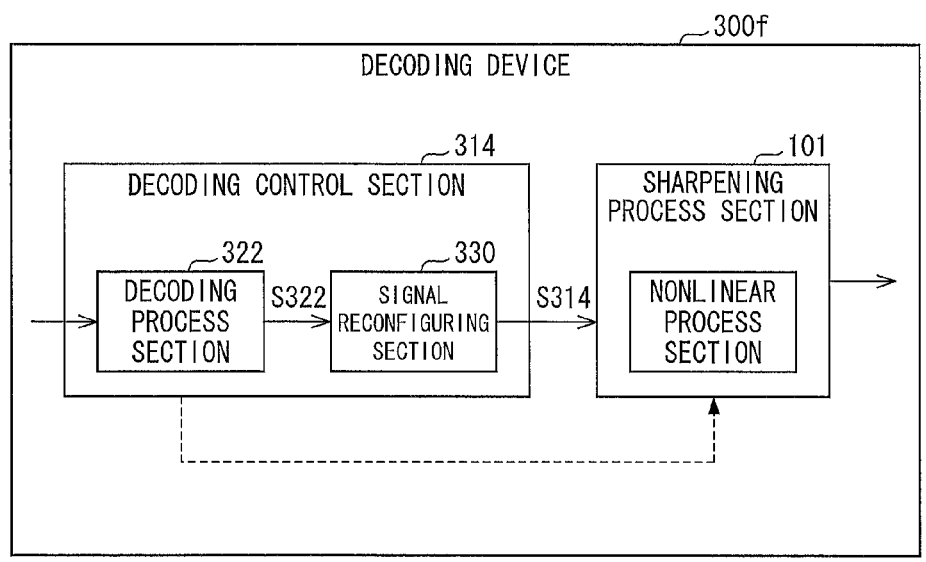

FIG. 21 is a block diagram showing a configuration of an encoding device corresponding to a decoding device shown in FIG. 22.

FIG. 22 is a block diagram showing yet another configuration of a decoding device according to the present invention.

Figure 23:
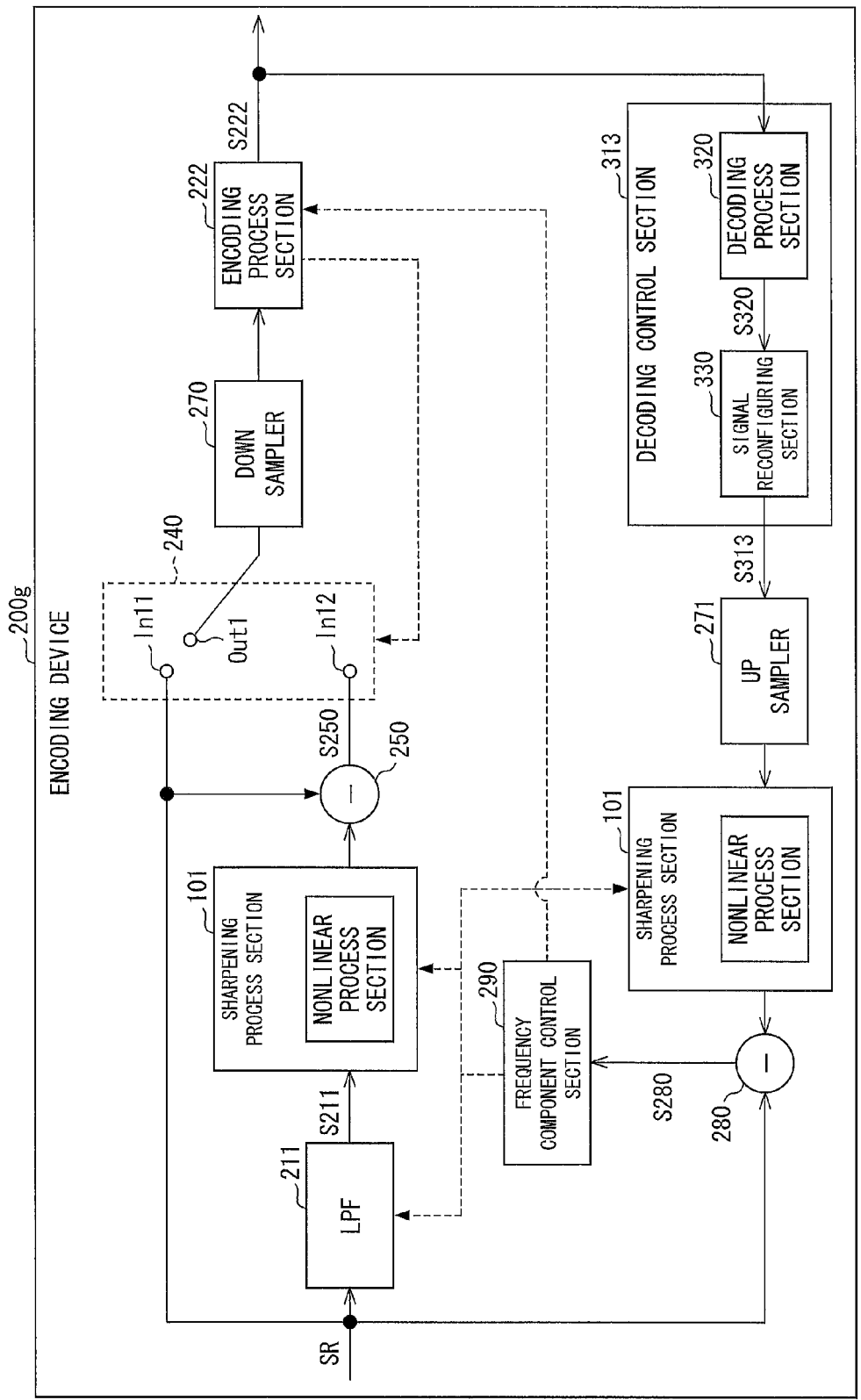

FIG. 23 is a block diagram showing a configuration example of a modification of the encoding device illustrated in FIG. 21.

Figure 24:
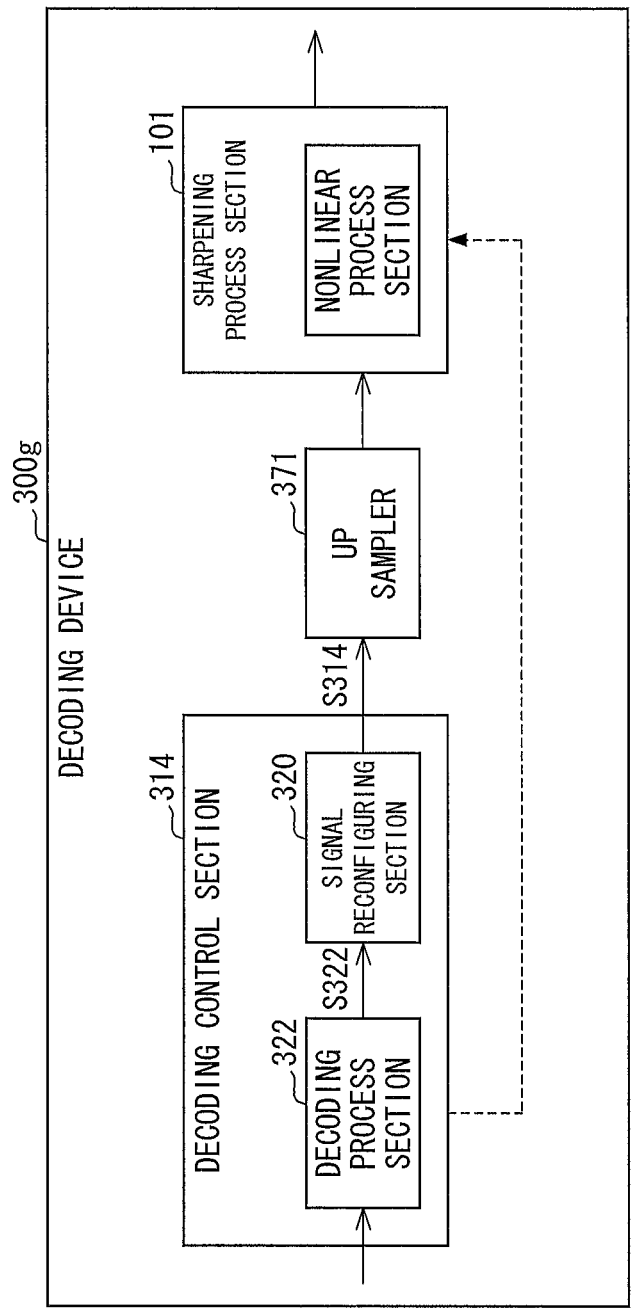

FIG. 24 is a block diagram showing a configuration example of a modification of the decoding device shown in FIG. 22.

DESCRIPTION OF EMBODIMENTS (Overview of Transmission System)

Described below is a transmission system 900 according to each of embodiments, with reference to FIG. 2. FIG. 2 is a block diagram showing a configuration of the transmission system 900.

As shown in FIG. 2, the transmission system 900 includes a sending subsystem 920 and a receiving subsystem 930. The sending subsystem 920 and the receiving subsystem 930 are connected so as to be communicable via a commonly known transmission path 700. The transmission path 700 may include a relay device such as a switch or a switchboard.

The sending subsystem 920 is, in brief, a system for sending a signal indicative of contents such as image, audio, or the like (hereinafter simply referred to as original signal SR) to the receiving subsystem 930, and includes functions that are usually provided on a sending side, such as an encoding function and a modulating function of the original signal SR. The sending subsystem 920 includes, in particular, an encoding device 200 that performs processes related to encoding. The configuration of the encoding device 200 is dealt with in the embodiments described below.

The receiving subsystem 930 is, in brief, a system for receiving a signal sent from the sending subsystem 920, and includes functions usually provided on a receiving side, such as a demodulation function, a decoding function, and the so-called 3R functions (reshaping, retiming, regenerating) of a signal. The receiving subsystem 930 in particular includes a decoding device 300 that performs processes related to decoding. The configuration of the decoding device 300 is dealt with in the embodiments described below.

When encoding devices 200a through 200g each later described are not distinguished therebetween, these devices are simply referred to as "encoding device 200". Moreover, when decoding devices 300a through 300g each later described are not distinguished therebetween, these devices are simply referred to as "decoding device 300".

Also note that an image indicated by the original signal SR (i.e. image prior to the encoding) is written as "original image", and an image reconstructed by decoding with the decoding device 300 is described as "reconstructed image".

Contents indicated by the original signal SR include contents such as a video image, a still image, audio, and the like; in each embodiment, descriptions are provided on the assumption of a video image in particular. Furthermore, the video image may be, for example, a video image that is displayed in real time with a receiver or the like of a standard definition television (SDTV) or a high definition television (HDTV). The video image is to be made of a plurality of frames (screens) that are consecutive in terms of time.

(Overview of Sharpening Process Section)

Figure 1:
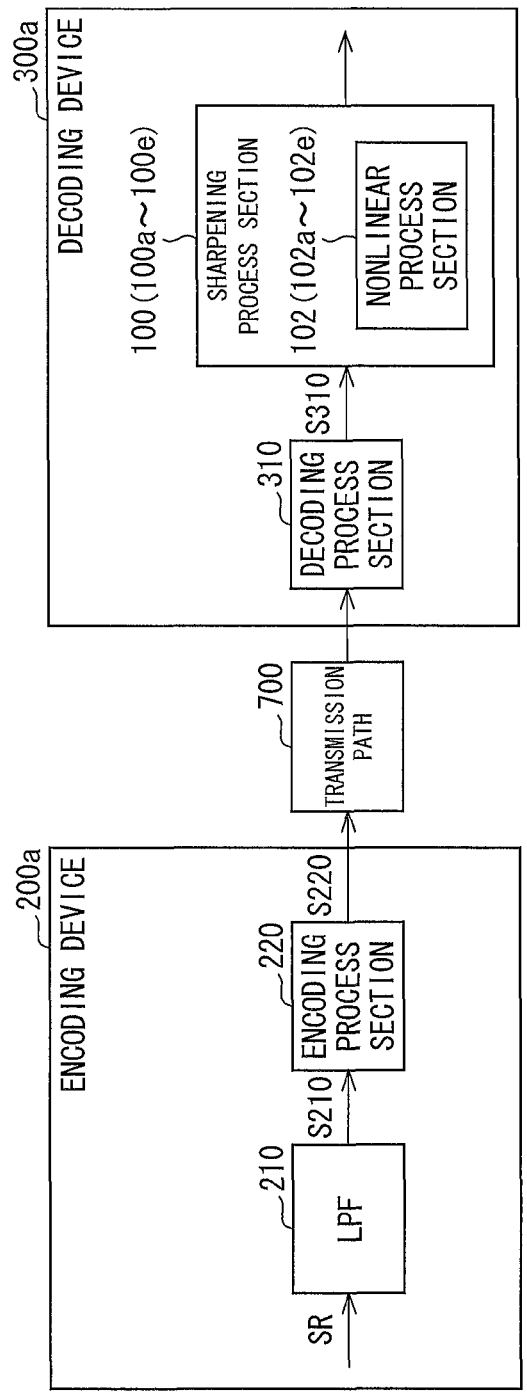
FIG. 1 is a block diagram showing a configuration of a decoding device and an encoding device according to the present invention.

The following description explains an outline of a sharpening process section (harmonics generation means) 100, which serves as a structural component of the encoding device 200 and the decoding device 300 (see for example FIG. 1). A specific configuration of the sharpening process section 100 is described later. When the sharpening process sections 100a through 100e later described are not distinguished therebetween, these are referred to simply as "sharpening process section 100".

The sharpening process section 100 is a device for carrying out a sharpening process to a signal received by the sharpening process section 100 (hereinafter, simply referred to as signal input) for sharpening a waveform of the signal input and outputting a sharpened signal output. The sharpening process indicates a process for making rising and falling of a signal input steep (i.e. enhancing rising and falling of a signal input). In particular, when the signal input indicates an image, rising and falling of a signal that corresponds to an outline part (edge) in the image is made steep.

Hereinafter, a signal input to the sharpening process section 100 is referred to as an input signal Sin. A signal output from the sharpening process section 100 is referred to as an output signal Sout.

As mentioned later, the sharpening process section 100 includes at least a nonlinear process section (nonlinear process means, second nonlinear process means) 102. The nonlinear process section 102 is a general name for nonlinear process sections 102a through 102e, each of which are described later. The sharpening process section 100 can make the output signal Sout include a high-frequency component which is not included in the input signal Sin (specifically, frequency component whose frequencies are higher than Nyquist frequency, which Nyquist frequency is half the sampling frequency when the input signal Sin is made discrete) by subjecting a high-frequency component of the input signal Sin to nonlinear operation in the nonlinear process section 102. Consequently, the sharpening process carried out by the sharpening process section 100 enables rising and falling of a signal input to be sharper than a case of a sharpening process based on linear operation.

Embodiment 1

Described below is an embodiment of the present invention, with reference to FIG. 1 to FIG. 15. The encoding device 200 of the present embodiment is referred to as an encoding device 200a. Moreover, the decoding device 300 of the present embodiment is referred to as a decoding device 300a.

(Configuration of Encoding Device and Decoding Device)

The following describes configurations of the encoding device 200a and the decoding device 300a, with reference to FIG. 1. FIG. 1 is a block diagram illustrating the configurations of the encoding device 200a and the decoding device 300a.

First described is the configuration of the encoding device 200a. As shown in FIG. 1, the encoding device 200a includes a low-pass filter (hereinafter, referred to as LPF) (frequency component extracting means) 210 and an encoding process section 220.

The LPF 210 is a commonly known low-pass filter, and removes high-frequency components out of frequency components of the original signal SR, from the original signal SR. The LPF 210 may be a low-pass filter in which frequency characteristics are adjustable (so-called adaptive low-pass filter). Note that a signal outputted from the LPF 210 is referred to as a high-frequency-free signal S210.

The encoding process section 220 is provided subsequently to the LPF 210, and encodes the high-frequency-free signal S210 outputted from the LPF 210. A signal outputted from the encoding process section 220 is referred to as an encoded signal S220.

The encoding process section 220 and a decoding process section (decoding means) 310 described later serve as a pair, and the encoding process section 220 is designed to output an encoded signal S220 that is decodable by the decoding process section 310.

In a case in which a video image is to be encoded, the encoding process section 220 performs compression encoding by the commonly known inter-frame predictive coding. Further, the encoded signal S220 is outputted including a motion vector used for carrying out motion compensation in the decoding process section 310.

Figure 3:
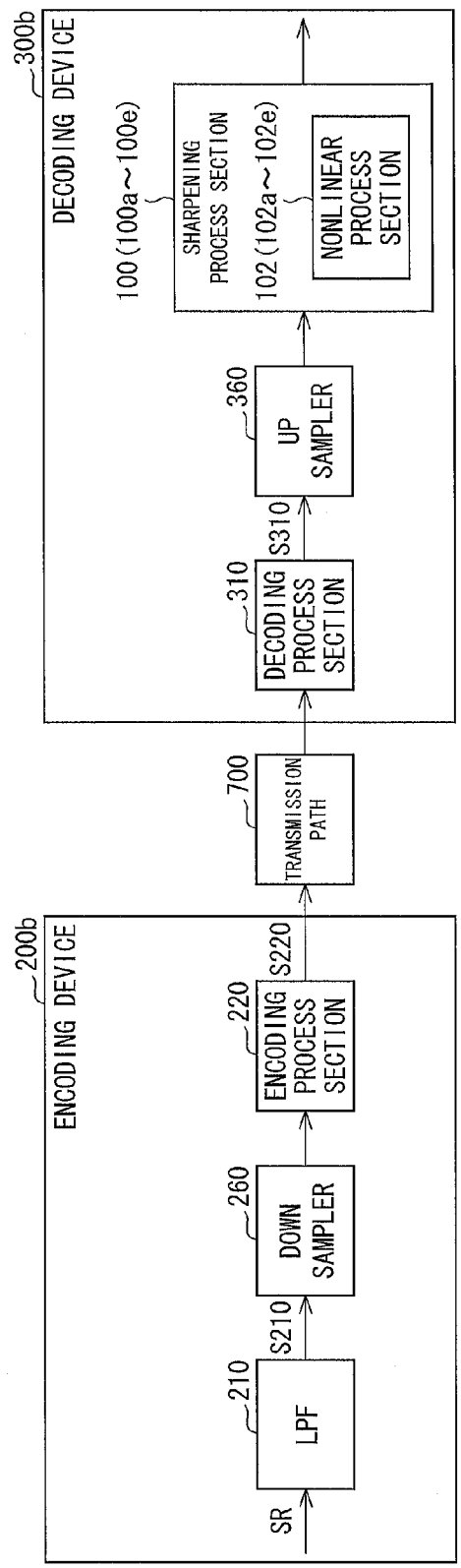
FIG. 3 is a block diagram showing an example of a configuration of a modification of the encoding device and the decoding device shown in FIG. 1.

Next describes the configuration of the decoding device 300a. The decoding device 300a includes a decoding process section 310 and a sharpening process section 100, as shown in FIG. 3.

The decoding process section 310, as described above, decodes the encoded signal S220 that is outputted from the encoding process section 220 of the encoding device 200a (decoding step). When a video image is to be decoded, the decoding process section 310 performs motion compensation by carrying out inter-frame prediction using the motion vector included in the encoded signal S220.

The signal outputted from the decoding process section 310 is referred to as a decoded signal S310. The decoded signal S310 is a signal indicative of a reconstructed image corresponding to the original image indicated by the original signal SR.

Next described is the sharpening process section 100. As described above, the sharpening process section 100 subjects a high-frequency component of the signal input to nonlinear operation in the nonlinear process section 102 (nonlinear process step), so that a high-frequency component not included in the signal input (specifically, a frequency component whose frequencies are higher than a Nyquist frequency, which Nyquist frequency is half a sampling frequency when an input signal Sin is made discrete) is included in the signal output, and causes the rise and fall of the signal input to be steep.

Since the decoding device 300a is designed in such a manner that the sharpening process section 100 is provided subsequently to the decoding process section 310, the decoded signal S310 outputted from the decoding process section 310 serves as the signal input of the sharpening process section 100. Accordingly, the decoding device 300a carries out a sharpening process to the decoded signal S310 in the sharpening process section 100, based on the nonlinear operation. Namely, the sharpening process section 100 of the decoding device 300a sharpens the reconstructed image of the decoded signal S310.

(Effect Attained by Configuration)

As described above, the encoding device 200a encodes the high-frequency-free signal S210 in which the high-frequency component is removed from the original signal SR. Hence, as compared to a case in which the original signal SR is encoded with the encoding device 200a, it is possible to reduce data amount of the encoded data by a removed amount of the high-frequency component. That is to say, the encoding device 200a allows for reducing a transmission rate of a signal to be transmitted through the transmission path 700. The reduction of the transmission rate allows for reducing costs required for the data transmission.

However, since the high-frequency component that was included in the original signal SR is removed, none of the removed high-frequency component will be included in the signal thus decoded if the encoded signal S220 that has been subjected to encoding is decoded on the receiving side. In this case, the reconstructed image indicated by the decoded signal S310 deteriorates (or is removed) in its part that corresponds to the high frequency component, as compared to the original image indicated by the original signal SR. That is to say, an outline part (edge) of the reconstructed image, which outline part corresponds to the high frequency component, cannot be sufficiently reconstructed in the reconstructed image; as a result, the reconstructed image becomes unsharp (the reconstructed image blurs). The same applies in a case in which the contents indicated by the original signal SR is of audio; audio thus decoded becomes unclear (e.g. sound quality deteriorates).

Meanwhile, the decoding device 300a of the present embodiment includes the sharpening process section 100 subsequently to the decoding process section 310, as described above. Since the sharpening process section 100 can make the signal output include the high-frequency component not included in the signal input, it is possible to sharpen the rise and fall of the decoded signal S310. As a result, the decoding device 300a can sharpen the contents indicated by a signal thus decoded, thereby making it possible to, for example in a case in which the contents is of image, minimize the blur of the image indicated by the decoded signal and improve its resolution. Moreover, the contents is similarly sharpened also in a case in which the contents is of audio, thereby allowing for clarifying the sound quality.

As a result, with the configuration in which encoding is carried out in the encoding device 200a and decoding is carried out in the decoding device 300a, such an effect is attained that a transmission rate of a signal to be transmitted through the transmission path 700 is reduced while the contents of signals that have been decoded on the receiving side are minimized in the degree of becoming unsharp.

(Modification 1)

Although the encoding device 200a is designed in such a manner that the LPF 210 and the encoding process section 220 are provided adjacent to each other, the LPF 210 and the encoding process section 220 are not necessarily provided adjacent to each other. That is, another device(s) (apparatus (es)) may be provided between the LPF 210 and the encoding process section 220, and the signal outputted from the LPF 210 may be received by the encoding process section 220 via the another device(s). Similarly, although the decoding device 300a is designed in such a manner that the decoding process section 310 and the sharpening process section 100 are provided adjacent to each other, these members do not necessarily need to be adjacent to each other. Namely, another device(s) (apparatus(es)) may be provided between the decoding process section 310 and the sharpening process section 100, and the signal outputted from the decoding process section 310 may be received by the sharpening process section 100 via the another device(s).

Described below is a configuration example in which another device (apparatus) is provided between the LPF 210 and the encoding process section 220 and between the decoding process section 310 and the sharpening process section 100, with reference to FIG. 3. FIG. 3 is a block diagram showing a configuration example of an encoding device 200b, which is a modification of the encoding device 200a, and a decoding device 300b, which is a modification of the decoding device 300a.

As shown in FIG. 3, the encoding device 200b has a down sampler 260 disposed between the LPF 210 and the encoding process section 220. The down sampler 260 carries out a common decimation to the high-frequency-free signal S210 outputted from the LPF 210. A signal thus thinned is inputted into the encoding process section 220.

The decoding device 300b has an up sampler (signal interpolation means) 360 disposed between the decoding process section 310 and the sharpening process section 100. The up sampler 360 corresponds to the down sampler 260, and carries out a common interpolation to the decoded signal S310 outputted from the decoding process section 310. A signal thus interpolated is thereafter received by the sharpening process section 100.

According to the configuration, data is decimated before the data is encoded. This allows for further reducing the data amount achieved as a result of the encoding. Namely, such an effect is attained that a transmission rate of a signal transmitted through the transmission path 700 may be further reduced.

Note that on the receiving side, interpolation is carried out to the decimated parts, to minimize the deterioration of the contents caused by the decimation.

After the interpolation by the up sampler 360, the interpolated signal is subjected to the nonlinear process by carrying out the sharpening process with the sharpening process section 100, to compensate a high-frequency band that exceeds the Nyquist frequency. This minimizes the image blur caused by the decimation and interpolation, and minimizes a decrease in resolution.

In a case in which a sharpening process by linear operation (conventional technique) is carried out to the signal after the signal is interpolated, the high-frequency band exceeding the Nyquist frequency cannot be compensated. Hence, the unsharpness cannot be improved that much (in a case of an image, it results in the blur remaining or in which the resolution does not improve that much).

(Modification 2)

Modification 2 described above deals with a configuration in which a down sampler is provided in the sending side and an up sampler corresponding to the down sampler is provided in the receiving side. A possible alternative configuration is one in which no down sampler is provided in the sending side, and just an up sampler is provided on the receiving side.

For example, assume a case in which, in a transmission system to transmit a signal for HDTV, a display device provided on the receiving side is a display having a pixel number of approximately 4000×2000 (so-called 4K display), which is a number larger than the number of pixels of a HDTV or the like. In this case, carrying out display on the display device upon up-converting the signal for the HDTV allows for improving the image quality of the image as compared to a case in which the image is displayed on the display device without up-converting the signal.

As described above, if it is preferable to carry out up-converting of contents on the receiving side, the receiving side is preferably provided with the up sampler 360 in the configuration of the receiving side as in the encoding device 200b, regardless of the configuration of the sending side.

(Modification 3)

It is generally known that when encoding and decoding contents, the contents that are decoded slightly deteriorate as compared to the contents which have not been encoded. Hence, regardless of the configuration of the encoding device on the sending side, it is preferable that the decoding device on the receiving side always includes the sharpening process section 100. This allows for the contents indicated by the decoded signal to always be sharpened, and minimizes the unsharpness caused in the contents.

(Configuration of Sharpening Process Section)

The following details the configuration of the sharpening process section 100.

FIG. 4 is a block diagram showing a configuration of a sharpening process section 100a. As shown in FIG. 4, the sharpening process section 100a includes a high-frequency component extracting section (low-frequency component removing means, second low-frequency component removing means) 11, a nonlinear process section 102a, and an addition section (addition means, second addition means) 15.

Figure 5:
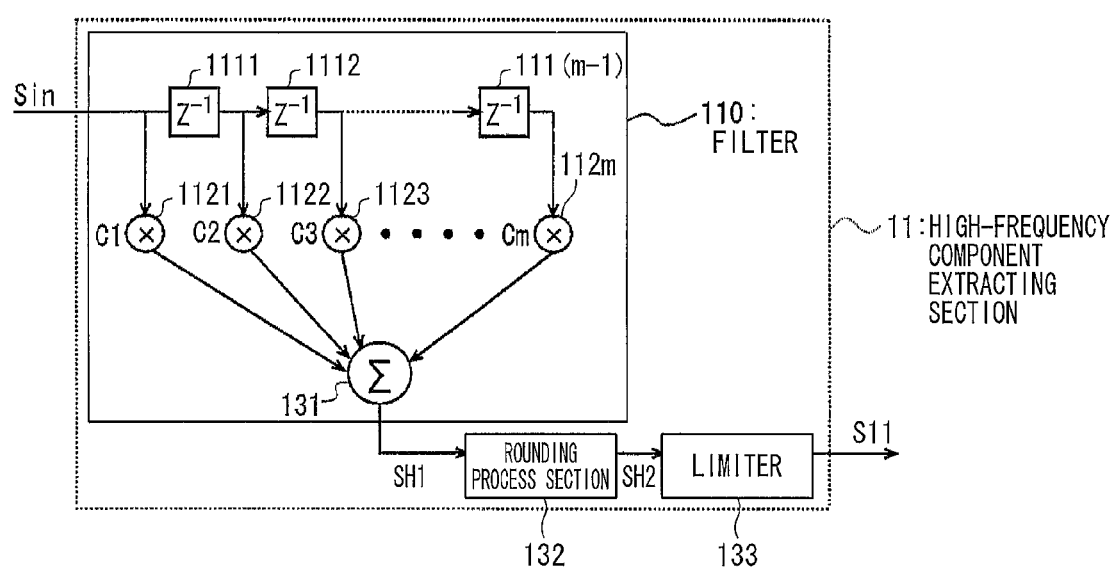
FIG. 5 is a block diagram showing a high-frequency component extracting section included in the sharpening process section shown in FIG. 4.

First, an explanation is made as to the high frequency component extracting section 11. Schematically, the high frequency component extracting section 11 extracts a high frequency component in the input signal Sin and outputs the component as a high-frequency signal S11 (low-frequency-free signal, second low-frequency-free signal) (low-frequency component removing step). With reference to FIG. 5, an explanation is made as to a configuration of the high-frequency component extracting section 11. FIG. 5 is a block diagram showing the configuration of the high-frequency component extracting section 11.

As shown in FIG. 5, the high-frequency component extracting section 11 includes a filter 110, a rounding process section (low-level signal removing means) 132, and a limiter (high-level signal removing means) 133.

The filter 110 is an m-tap transversal high-pass filter including m−1 unit delay elements $111h$ (h=1, 2, . . . , m−1: m is a positive integer of 3 or greater), m multiplication sections $112k$ (k=1, 2, . . . , m), and an addition section 131. The filter 110 receives the input signal Sin as input and outputs a high band signal SH1.

Each of the unit delay elements $111h$ delays an input signal by unit time and outputs the delayed signal. The unit delay element 1111 (h=1) receives the input signal Sin.

Each of the multiplication sections $112k$ multiplies the input signal with a coefficient Ck, and outputs the result of the multiplication to the addition section 131. The coefficient Ck is set beforehand so that the filter 110 serves as a high-pass filter. For example, in a case in which m=3, by setting C1, C2, and C3 to 0.5, −1, and 0.5, respectively, the filter 110 serves as a high-pass filter.

The addition section 131 adds signals from the addition sections $112k$ so as to generate the high band signal SH1.

As is generally known, a low-pass filter is easier to fabricate than fabricating a high-pass filter. Therefore, the filter 110 may be constituted of a low-pass filter. FIG. 6 shows another configuration example of the filter 110. As shown in FIG. 6, the filter 110 may be constituted of a low-pass filter 1101 and a subtraction section 1102.

In order not to amplitude noises in the nonlinear process section 102 provided subsequently, the rounding process section 132 removes a low level signal which can be regarded as a noise in the high band signal SH1, thereby generating a low-level-free signal SH2.

Specifically, out of signal values of the high band signal SH1, the rounding process section 132 changes a signal value whose absolute value is not more than a predetermined lower limit LV to "0", thereby generating the low-level-free signal SH2.

For example, in a case in which the input signal Sin can be any integer ranging from −255 to 255, when the lower limit LV is "2", the rounding process section 132 regards, as noises, all signal values whose absolute value is not more than "2" out of signal values of the high band signal SH1, and changes such signal values to "0" (i.e. rounds such signal values).

Subsequently, in order that a signal already having a sufficiently high energy is not further amplified in the nonlinear process section 102 provided subsequently, the limiter 133 removes a high-level signal value in the low-level-free signal SH2, thereby generating a high-frequency signal S11.

Specifically, in order that a signal value of the low-level-free signal SH2 is not more than a predetermined upper limit UV1, with respect to signal values of the low-level-free signal SH2, the limiter 133 carries out a process of changing signal values whose absolute values are more than the upper limit UV1 so that their absolute values are not more than the upper limit UV1 (hereinafter also referred to as a clipping process), thereby generating the high-frequency signal S11.

For example, out of signal values of the low-level-free signal SH2, signal values whose absolute values are more than "64" are changed to "64" or "−64" according to signs. Alternatively, the signal values may be changed to "0".

In a case in which the input signal Sin is an 8-bit signal, the filter 110 adds, to the input signal Sin, a signal limited to be not more than 3rd MSB (approximately 64 or −64 in 8-bit signal) based on 12-bit calculation. Accordingly, the rounding process section 132 and the limiter 133 carry out a process of limiting the result of calculation by the filter 110 to 8-bit signals.

In the above explanation, the high-frequency component extracting section 11 includes the rounding process section 132 and the limiter 133. Alternatively, the high-frequency component extracting section 11 may include a member obtained by integrating the rounding process section 132 and the limiter 133 with each other.

Next, the nonlinear process section 102a is to be described. The nonlinear process section 102a includes a nonlinear operation section (even exponentiation operation means, square root operation means) 21, a sign changing section (sign changing means) 41, and a limiter (amplitude adjustment means) 51 (see FIG. 4).

The nonlinear operation section 21 carries out a nonlinear operation to the high-frequency signal S11, so as to generate a nonlinear signal S21.

The nonlinear operation which is carried out by the nonlinear operation section 21 is described here. The following description denotes a signal value to be supplied to the nonlinear operation section 21 as x, denotes a signal value to be supplied from the nonlinear operation section 21 as y, and expresses the nonlinear operation which is carried out by the nonlinear operation section 21 as a function y=f(x).

Assume here that the function f(x) is a nonlinear monotone increasing function which monotonically increases so as to be in positive and negative symmetry (origin symmetry). Note that "monotone increasing" means broad monotone increasing. However, it is only necessary that the function f(x) monotonically increase at least in the vicinity of x="0". It is preferable that the function f(x) be |f(x)|>|x| at least in the vicinity of x="0".

Such a function f(x) is exemplified by those expressed as the following expressions (1) through (3). Note that it is preferable that the functions f(x) expressed as the expressions (2) and (3) be used in an interval 0≤x≤1 since the functions f(x) greatly increase in the interval.

Math. 1

$$f(x)=x^{2n} \text{ (} n \text{ is a natural number)} \tag{1}$$

Math. 2

$$f(x)=|x|^{1/2} \tag{2}$$

Math. 3

$$f(x)=|x|^{1/10} \tag{3}$$

In a case in which the expression (1) is used as the function f(x), the nonlinear operation section 21 raises the high-frequency signal S11 to an even exponent not less than 2, so as to generate the nonlinear signal S21 (even exponentiation signal, square root signal). For example, in a case in which n=1 (i.e., f(x)=x²) in the expression (1), the nonlinear operation section 21 squares the high-frequency signal S11, to generate the nonlinear signal S21. Assuming in this case that data rows constituting the high-frequency signal S11 are X1, X2, X3, . . . , the nonlinear signal S21 obtained by squaring the high-frequency signal S11 becomes a digital signal constituted by data rows X1², X2², and X3², . . . .

In a case in which a signal value of the high-frequency signal S11 is any of integer values −255 through 255, 255 may be used to normalize x, in using the function f(x). For example, the expression (2) may be replaced with the following expression (4) obtained by using x/255 to normalize x on the right side of the function f(x) expressed as the expression (2) and multiplying the right side by 255. Note that the expression (4) meets the requirement of f(x)>x.

Math. 4

$$f(x)=255|x/255|^{1/2} \tag{4}$$

In the expression (4), 255 is used to normalize x on the right side of the function f(x) expressed as the expression (2) and the right side is multiplied by 255. However, a numerical value by which the right side is multiplied does not need to be identical to a value (255 in this example) to normalize x. It is only necessary that the numerical value meet the requirement of |f(x)|>|x|. For example, the following expression (5) in which the right side is multiplied by 100 instead of 255 may be replaced with the expression (4).

Math. 5

$$f(x)=100|x/255|^{1/2} \tag{5}$$

Further, the function f(x) may be expressed as the following expression (6), which uses a trigonometric function.

Math. 6

$$f(x)=255|\sin[(x/255)(\pi/2)]| \tag{6}$$

Subsequently, in accordance with sign bit information on the high-frequency signal S11, the sign changing section 41 generates, as a sign change signal S41, a signal obtained by reflecting a sign of the high-frequency signal S11 in the nonlinear signal S21. Namely, the sign changing section 41 retains a sign of a part of the nonlinear signal S21 which part is identical in sign to the high-frequency signal S11. In contrast, the sign changing section 41 reverses positive and negative signs of a part of the nonlinear signal S21 which part is different in sign from the high-frequency signal S11.

Then, the limiter 51 carries out a process (hereinafter also described as an amplitude adjustment process) for adjusting an amplitude (signal level, intensity) of the sign change signal S41 which is generated by the sign changing section 41, to generate a nonlinear process signal (second nonlinear process signal) S12. Specifically, the limiter 51 multiplies the sign change signal S41 by a specific magnification value ($|\alpha|<1$), so as to adjust the amplitude of the sign change signal S41. The magnification value $\alpha$ is appropriately set according to characteristics of a transmission path.

In order not to further amplify a signal which has sufficient energy, the limiter 51 carries out a process (hereinafter also described as a clip process) for changing, to a value not more than a predetermined upper limit UV2, an absolute value of a part of the nonlinear process signal S12 which part has an absolute value higher than the upper limit UV2, so that a signal value of the nonlinear process signal S12 is not more than the upper limit UV2. For example, in a case in which a part of the nonlinear process signal S12 has a signal value whose absolute value exceeds "64", the limiter 51 changes the signal value to "64" or "−64" in accordance with a sign of the absolute value. Alternatively, the limiter 51 changes the absolute value to "0".

Note that the nonlinear process section 102a may include no limiter 51 that carries out the amplitude adjustment process and the clip process to the sign change signal S41. In this case, the nonlinear process section 102a outputs, as the nonlinear process signal S12, the sign change signal S41 that is generated by the sign changing section 41.

Finally, the addition section 15 is to be described. The addition section 15 adds the nonlinear process signal S12 as a correction signal to the input signal Sin, so as to generate the output signal Sout (addition step). Note that the addition section 15 appropriately includes a delay element for adjusting a timing between the input signal Sin and the nonlinear process signal S12.

(Waveform of Signal in Configuration Example 1)

The following description discusses waveforms of signals generated by sections of the sharpening process section 100a with reference to (a) through (e) of FIG. 7. (a) through (e) of FIG. 7 schematically illustrate waveforms of the signals generated by the sections of the sharpening process section 100a. It is assumed here that the sharpening process section 100a receives the signal shown in (a) of FIG. 7 as the input signal Sin.

Initially, when the input signal Sin is inputted to the high-frequency component extracting section 11, a high-frequency component included in the input signal Sin is extracted so that the high-frequency signal S11 shown in (b) of FIG. 7 is generated.

Next, in a case in which the nonlinear operation carried out by the nonlinear operation section 21 of the nonlinear process section 102a is $f(x)=x^2$, the nonlinear operation section 21 generates the nonlinear signal S21 obtained by squaring the high-frequency signal S11 (see (c) of FIG. 7).

Subsequently, the sign changing section 41 that has received the nonlinear signal S21 generates the sign change signal S41 (see (d) of FIG. 7). As illustrated in (d) of FIG. 7, the sign change signal S41 retains positive and negative signs of the high-frequency signal S11 shown in (b) of FIG. 7.

Then, the limiter 51 which has received the sign change signal S41 carries out the amplitude adjustment process and the clip process, so as to generate the nonlinear process signal S12. Thereafter, the addition section 15 adds the nonlinear process signal S12 to the input signal Sin, so as to generate the output signal Sout (see (e) of FIG. 7).

Note that a rise and a fall of the signal of the nonlinear process signal S12 (see (e) of FIG. 7), which are steeper than those of a signal obtained by enhancing the input signal Sin by use of the linear operation, are to be described with reference to FIG. 8.

The signal shown in (a) of FIG. 8 is identical to the input signal Sin shown in (a) of FIG. 7. In order to enhance the input signal Sin shown in (a) of FIG. 8, a sharpening process using the linear operation uses a method in which a high-frequency signal is extracted from the input signal Sin shown in (a) of FIG. 8 and the input signal Sin is added to the high-frequency signal thus extracted. Therefore, a signal component which is not contained in the input signal Sin and exceeds the Nyquist frequency is not added in the conventional sharpening process using the linear operation.

Consequently, in the sharpening process based on linear operation, a signal shown in (b) of FIG. 8 is generated. Rising of the signal shown in (b) of FIG. 8 is sharper than rising of the input signal Sin shown in (a) of FIG. 8. However, rising of the non-liner process signal S12 ((e) of FIG. 7) generated by the sharpening process section 100a is further steeper.

(Configuration Example 2 of Sharpening Process Section)

The nonlinear process section 102a described above may differentiate the nonlinear signal S21 which is generated by the nonlinear operation section 21. This is because differentiation of the nonlinear signal S21 allows removal of a direct-current component contained in the nonlinear operation section 21.

Therefore, a configuration example of the sharpening process section 100b is to be described with reference to FIG. 9. FIG. 9 is a block diagram illustrating a configuration of the sharpening process section 100b.

As shown in FIG. 9, the sharpening process section 100b includes a high-frequency component extracting section 11, a nonlinear process section 102b, and an addition section 15. The nonlinear process section 102b includes not only the configuration of the nonlinear process section 102a shown in FIG. 4 but also a differentiation section (differentiation means) 31 between the nonlinear operation section 21 and the sign changing section 41. The high-frequency component extracting section 11, members other than the differentiation section 31 in the nonlinear process section 102b, and the addition section 15 are the same as those explained above and therefore detailed explanations thereof are omitted here.

The differentiation section 31 differentiates the nonlinear signal S21 generated by the nonlinear operation section 21, thereby generating a differentiation signal S31.

A configuration of the differentiation section 31 is to be described with reference to FIG. 10. FIG. 10 is a block diagram illustrating a configuration of the differentiation section 31. As shown in FIG. 10, the differentiation section 31 includes a unit delay element 3111 and a subtraction section 3112. The differentiation section 31 finds a backward difference with respect to a signal to be supplied to the differentiation section 31.

With respect to the differential signal S31 which has been generated by the differentiation section 31, in accordance with sign bit information on the high-frequency signal S11, the sign changing section 41 generates, as a sign change signal S42, a signal obtained by reflecting a sign of the high-frequency signal S11 in the nonlinear signal S21. Namely, the sign changing section 41 retains a sign of a part of the differential signal S31 which part is identical in sign to the high-frequency signal S11. In contrast, the sign changing section 41 reverses positive and negative signs of a part of the nonlinear signal S21 which part is different in sign from the high-frequency signal S11.

The limiter 51 carries out the amplitude adjustment process and the clip process with respect to the sign change signal S42 which is generated by the sign changing section 41, so as to generate the nonlinear process signal S12. According to the amplitude adjustment process, the sign change signal S42 is multiplied by a predetermined magnification value α, to adjust an amplitude of the sign change signal S42.

Note that the nonlinear process section 102b may include no limiter 51 and not carry out the amplitude adjustment process and the clip process with respect to the sign change signal S42. In this case, the nonlinear process section 102b outputs, as the nonlinear process signal S12, the sign change signal S42 which is generated by the sign changing section 41.

(Waveform of Signal in Configuration Example 2)

The following explains waveforms of signals generated by sections of the waveform shaping device 100b with reference to (a) through (f) of FIG. 11. (a) through (f) of FIG. 11 schematically show waveforms of signals generated by sections of the sharpening process section 100b. Here, it is assumed that a signal shown in (a) of FIG. 11 is inputted as the input signal Sin to the sharpening process section 100b. The signal shown in (a) of FIG. 11 is the same as the signal shown in (a) of FIG. 7.

Initially, when the input signal Sin is inputted to the high-frequency component extracting section 11, a high-frequency component included in the input signal Sin is extracted so that the high-frequency signal S11 shown in (b) of FIG. 11 is generated.

Subsequently, when nonlinear operation carried out by the nonlinear operation section 21 of the nonlinear process section 102b is based on $f(x)=x^2$, the nonlinear signal S21 obtained by squaring the high-frequency signal S11 is generated by the nonlinear operation section 21 (see (c) of FIG. 11).

Subsequently, when the nonlinear signal S21 is inputted to the differentiation section 31, the differentiation signal S31 shown in (d) of FIG. 11 is generated. It should be noted that the differentiation signal S31 does not include a direct current component which has been included in the nonlinear signal S21.

Subsequently, when the differentiation signal S31 is inputted into the sign changing section 41, the sign change signal S42 shown in (e) of FIG. 11 is generated. As shown in (e) of FIG. 11, the sign change signal S42 has the same positive and negative signs as those of the high-frequency signal S11 shown in (b) of FIG. 11.

Subsequently, when the sign change signal S41 is inputted to the limiter 51, the amplitude adjustment process and the clipping process are carried out, to generate the nonlinear process signal S12. Lastly, the addition section 15 adds the nonlinear process signal S12 to the input signal Sin, thereby generating the output signal Sout (see (f) of FIG. 11).

Rising and falling of the output signal Sout shown in (f) of FIG. 11 are steeper than those of a signal sharpened based on linear operation.

(Configuration Example 3 of Sharpening Process Section)

The nonlinear process section 102a and the nonlinear process section 102b explained above include the sign changing section 41. Alternatively, the nonlinear process section of the present invention may be arranged not to include the sign changing section 41 as long as the nonlinear operation carried out on the high-frequency signal S11 retains the positive and negative signs of the high-frequency signal S11.

With reference to FIG. 12, the following explains a configuration example of a sharpening process section 100c which does not include the sign changing section 41. FIG. 12 is a block diagram showing a configuration of the sharpening process section 100c.

As shown in FIG. 12, the sharpening process section 100c includes a high-frequency component extracting section 11, a nonlinear process section 102c, and an addition section 15. The nonlinear process section 102c includes a nonlinear operation section (odd exponentiation operation means) 22 and a limiter 51. The high-frequency component extracting section 11, the limiter 51, and the addition section 15 are the same as those explained above and detailed explanations thereof are omitted here.

The nonlinear operation section 22 carries out nonlinear operation on the high-frequency signal S11, thereby generating a nonlinear signal S22.

The nonlinear operation which is carried out by the nonlinear operation section 22 is described here. The following description denotes a signal value to be supplied to the nonlinear operation section 22 as x, denotes a signal value to be supplied from the nonlinear operation section 22 as y, and expresses the nonlinear operation which is carried out by the nonlinear operation section 22 as a function y=g(x).

Assume here that the function g(x) is a nonlinear monotone increasing function which monotonically increases so as to be in positive and negative symmetry (origin symmetry). Note that "monotone increasing" means broad monotone increasing. However, it is only necessary that the function g(x) monotonically increases at least in the vicinity of x="0". It is preferable that the function g(x) be |g(x)|>|x| at least in the vicinity of x="0".

Such a function g(x) is exemplified by that expressed as the following expression (7).

Math. 7

$$g(x)=x^{3n} \text{ (}n\text{ is a natural number)} \tag{7}$$

In a case in which the expression (7) is used as the function g(x), the nonlinear operation section 22 raises the high-frequency signal S11 to an odd exponent not less than 3, so as to generate the nonlinear signal S22. For example, in a case in which n=1 (i.e., $g(x)=x^3$) in the expression (7), the nonlinear operation section 22 cubes the high-frequency signal S11, so as to generate the nonlinear signal S22. Assuming in this case that data rows constituting the high-frequency signal S11 are X1, X2, X3, ..., the nonlinear signal S22 obtained by cubing the high-frequency signal S11 becomes a digital signal constituted by data rows $X1^3$, $X2^3$, and $X3^3$, ....

The limiter 51 carries out the amplitude adjustment process and the clip process to the nonlinear signal S22 generated by the nonlinear operation section 22, so as to generate the nonlinear process signal S12.

Note that the nonlinear process section 102c may include no limiter 51 that carries out the amplitude adjustment process and the clip process to the nonlinear signal S22. In this case, the nonlinear process section 102c outputs, as the nonlinear process signal S12, the nonlinear signal S22 that is generated by the nonlinear operation section 22.

(Waveform of Signal in Configuration Example 3)

The following explains waveforms of signals generated by sections of the sharpening process section 100c with reference to (a) through (d) of FIG. 13. (a) through (d) of FIG. 13 schematically show waveforms of the signals generated by sections of the sharpening process section 100c. Here, it is assumed that a signal shown in (a) of FIG. 13 is inputted to the sharpening process section 100c as the input signal Sin. The signal shown in (a) of FIG. 13 is the same as the signal shown in (a) of FIG. 7.

Initially, when the input signal Sin is inputted to the high-frequency component extracting section 11, a high-frequency component included in the input signal Sin is extracted so that the high-frequency signal S11 shown in (b) of FIG. 13 is generated.

Subsequently, when nonlinear operation carried out by the nonlinear operation section 22 is $f(x)=x^3$, the nonlinear signal S22 obtained by raising the high-frequency signal S11 to the power of three is generated by the nonlinear operation section 22 (see (c) of FIG. 13).

Subsequently, when the nonlinear signal S22 is inputted to the limiter 51, the amplitude regulating process and the clipping process are carried out, to generate the nonlinear process signal S12. Lastly, the addition section 15 adds the nonlinear process signal S12 to the input signal Sin, thereby generating the output signal Sout (see (d) of FIG. 13).

Rising and falling of the output signal Sout shown in (d) of FIG. 13 are steeper than those of a signal sharpened based on linear operation.

(Reason why Frequency Higher than Nyquist Frequency is Generated)

The following explains why the output signal Sout generated by the sharpening process section 100 includes a high-frequency component higher than Nyquist frequency fs/2, such as a harmonic wave component included in the input signal Sin.

Here, it is assumed that the input signal Sin is represented by a function $F(x)$ where x represents time. When a base angular frequency of the input signal Sin is $\omega$, the function $F(x)$ can be represented by formula (8) below which is a Fourier series.

Math. 8

$$F(x) = a_{-N}\cos(-N)\omega x + a_{-N+1}\cos(-N+1)\omega x + \\ \ldots + a_{-1}\cos(-1)\omega x + a_0 + a_1\cos\omega x + a_2\cos 2\omega x + \ldots + \\ a_N \cos N\omega x + b_{-N}\sin(-N)\omega x + b_{-N+1}(-N+1)\omega x + \ldots + \\ b_{-1}\sin(-1)\omega x + b_1\sin\omega x + b_2\sin 2\omega x + \ldots + b_N \sin N\omega x \quad (8)$$

In the expression (8), N is a degree of a higher harmonic wave having a maximum frequency which does not exceed the Nyquist frequency fs/2 with respect to the sampling frequency fs. Namely, the following expression (9) is met.

Math. 9

$$N\omega/(2\pi) \leq fs/2 \leq (N+1)\omega/(2\pi) \quad (9)$$

Next, in a case in which a signal of the input signal Sin expressed as the function $F(x)$ other than a direct-current component $a_0$ is denoted as $G(x)$, $G(x)$ is expressed as the following expression (10).

Math. 10

$$G(x) = \\ a_{-N}\cos(-N)\omega x + a_{-N+1}\cos(-N+1)\omega x + \ldots + a_{-1}\cos(-1)\omega x + \\ a_1\cos\omega x + a_2\cos 2\omega x + \ldots + a_N\cos N\omega x + b_{-N}\sin(-N)\omega x + \\ \ldots + b_{-1}\sin(-1)\omega x + b_1\sin\omega x + b_2\sin 2\omega x + \ldots + b_N\sin N\omega x \quad (10)$$

Here, the input signal Sin inputted into the sharpening process section 100 includes a signal $G(x)$ or a high-frequency component of the signal $G(x)$.

For example, in a case in which the nonlinear operation section 21 carries out the nonlinear operation of $f(x)=x^2$, the nonlinear operation section 21 generates the nonlinear signal S21 by squaring the high-frequency signal S11. Note here that each term of $(G(x))^2$ is expressed as any of the following expressions (11) through (13) based on the expression (10) ($i=\pm 1, \pm 2, \pm N$; $j=\pm 1, \pm 2, \pm N$).

Math. 11

$$a_i \cos i\omega x \cdot a_j \cos j\omega x \quad (11)$$

Math. 12

$$a_i \cos i\omega x \cdot b_j \sin j\omega x \quad (12)$$

Math. 13

$$b_i \sin i\omega x \cdot b_j \sin j\omega x \quad (13)$$

Note here that the expressions (11) through (13) can be rewritten to the following respective expressions (14) through (16) by use of trigonometric formulae.

Math. 14

$$(a_i a_j/2)\{\cos(i+j)\omega x + \cos(i-j)\omega x\} \quad (14)$$

Math. 15

$$(a_i b_j/2)\{\sin(i+j)\omega x + \sin(i-j)\omega x\} \quad (15)$$

Math. 16

$$(-b_i b_j/2)\{\cos(i+j)\omega x - \cos(i-j)\omega x\} \quad (16)$$

$(G(x))^2$ contains angular frequency components such as $(N+1)\omega, (N+2)\omega, \ldots,$ and $2N\omega$ (see expressions (14) through (16)).

Accordingly, $(G(x))^2$ contains a frequency component which is higher than the Nyquist frequency fs/2. Namely, the nonlinear signal S21 which is generated by the nonlinear operation section 21 contains a frequency component which is higher than the Nyquist frequency fs/2 such as a harmonic component having a frequency of $2N\omega/(2\pi)$.

Similarly, for example, in a case in which the nonlinear operation section 22 carries out the nonlinear operation of $f(x)=x^3$, the nonlinear operation section 22 generates the nonlinear signal S22 by cubing the high-frequency signal S11. Note here that each term of $(G(x))^3$ is expressed as any of the following expressions (17) through (20) based on the expression (10) ($i=\pm 1, \pm 2, \pm N$; $j=\pm 1, \pm 2, \pm N$).

Math. 17

$$a_i \cos i\omega x \cdot a_j \cos j\omega x \cdot a_k \cos k\omega x \quad (17)$$

Math. 18

$$a_i \cos i\omega x \cdot a_j \cos j\omega x \cdot b_k \sin k\omega x \quad (18)$$

Math. 19

$$a_i \cos i\omega x \cdot b_j \sin j\omega x \cdot b_k \sin k\omega x \quad (19)$$

Math. 20

$$b_i \sin i\omega x \cdot b_j \sin j\omega x \cdot b_k \sin k\omega x \quad (20)$$

Note here that, in a case in which attention is paid to terms in which i=j=k=N and which are expressed as the expressions

(17) and (20), these terms can be rewritten to the following respective expressions (21) and (22) by use of trigonometric formulae.

Math. 21

$$(a_N \cos N\omega x)^3 = a_N^3\{(3/4)\cos N\omega x + (1/4)\cos 3N\omega x\} \quad (21)$$

Math. 22

$$(b_N \sin N\omega x)^3 = b_N^3\{(3/4)\sin N\omega x + (1/4)\sin 3N\omega x\} \quad (22)$$

Moreover, for example, in a case in which attention is paid to terms in which i=j=k=−N and which are expressed as the expressions (17) and (20), these terms can be rewritten to the following respective expressions (23) and (24) by use of trigonometric formulae.

Math. 23

$$\{a_N \cos(-N\omega x)\}^3 = a_N^3\{(3/4)\cos(-N\omega x) + (1/4)\cos(-3N\omega x)\} \quad (23)$$

Math. 24

$$\{b_N \sin(-N\omega x)\}^3 = b_N^3\{(3/4)\sin(-N\omega x) + (1/4)\sin(-3N\omega x)\} \quad (24)$$

$(G(x))^3$ contains a frequency component which is 3N times a base angular frequency ω and a frequency component which is −3N times the base angular frequency ω (see the expressions (21) through (24)). The expressions (21) through (24) show that, in a case in which the other terms of $(G(x))^3$ are rewritten by use of trigonometric formulae, $(G(x))^3$ contains various frequency components which range from 3N times to −3N times the base angular frequency ω.

Accordingly, $(G(x))^3$ contains a frequency component which is higher than the Nyquist frequency fs/2. Namely, the nonlinear signal S22 which is generated by the nonlinear operation section 22 contains a frequency component which is higher than the Nyquist frequency fs/2 such as a harmonic component having a frequency of 3Nω/(2π).

As described above, the output signal Sout generated by the sharpening process section 100 includes a high frequency component which is not included in the input signal Sin, i.e. a frequency component whose frequencies are higher than the Nyquist frequency.

(Another Configuration Example 1 of Sharpening Process Section)

There are many kinds of nonlinear operation carried out by the sharpening process section 100 other than those explained above. With reference to FIGS. 14 and 15, the following explains configuration examples of a sharpening process section 100d and a sharpening process section 100e.

Initially, FIG. 14 is a block diagram showing a configuration of the sharpening process section 100d. As shown in FIG. 14, the sharpening process section 100d includes a high frequency component extracting section 11, a nonlinear process section 102d, and an addition section 15. The high-frequency component extracting section 11 and the addition section 15 are the same as those explained above and thus detailed explanations thereof are omitted here.

The nonlinear process section 102d includes a square operation section 61, a first differentiation section 71, a second differentiation section 81, and a multiplication section 91.

The square operation section 61 squares the high-frequency signal S11, thereby generating a square signal S61. That is, when data rows constituting the high-frequency signal S11 are X1, X2, X3, . . . , the square signal S61 obtained by squaring the high-frequency signal S11 is a digital signal constituted by data rows $X1^2$, $X2^2$, $X3^2$, . . . .

Subsequently, the first differentiation section 71 differentiates the square signal S61 generated by the square operation section 61, thereby generating a first differentiation signal S71. The configuration of the first differentiation section 71 is the same as that of the differentiation section 31 for example.

Subsequently, the second differentiation section 81 differentiates the input signal Sin, thereby generating a second differentiation signal S81. The configuration of the second differentiation section 81 is the same as that of the differentiation section 31 for example.

Subsequently, the multiplication section 91 multiplies the first differentiation signal S71 with the second differentiation signal S81, thereby generating a nonlinear process signal S12. That is, when data rows constituting the first differentiation signal S71 are U1, U2, U3, . . . and data rows constituting the second differentiation signal S81 are V1, V2, V3, . . . , the nonlinear process signal S12 is a digital signal constituted by data rows U1·V1, U2·V2, U3·V3, . . . .

In the configuration explained above, there is provided the square operation section 61 in order to carry out nonlinear operation. Alternatively, there may be used a fourth power operation section which raises the high-frequency signal S11 to the fourth power. More generally, there may be used an exponentiation operation section which generates a signal obtained by raising the high-frequency signal S11 to an even exponent not less than 2.

(Another Configuration Example 2 of Sharpening Process Section)

The sharpening process section 100d explained above includes the square operation section 61. Alternatively, the sharpening process section may include, instead of the square operation section 61, an absolute value process section 62 which calculates the absolute value of an input signal.

Accordingly, with reference to FIG. 15, the following explains a sharpening process section 100e including the absolute value process section 62. FIG. 15 is a block diagram showing a configuration of the sharpening process section 100e.

As shown in FIG. 15, the sharpening process section 100e includes a high frequency component extracting section 11, a nonlinear process section 102e, and an addition section 15. The high-frequency component extracting section 11 and the addition section 15 are the same as those explained above, and thus detailed explanations thereof are omitted here.

The nonlinear process section 102e includes the absolute value process section 62, a first differentiation section 71, a second differentiation section 81, and a multiplication section 91. The first differentiation section 71, the second differentiation section 81, and the multiplication section 91 are the same as those explained above, and thus detailed explanations thereof are omitted here.

The absolute value process section 62 generates an absolute value signal S62 which is a signal whose values correspond to absolute values of the high-frequency signal S11. That is, when data rows constituting the high-frequency signal S11 are X1, X2, X3, . . . , the absolute value signal S62 is a digital signal constituted by data rows |X1|, |X2|, |X3|, . . . .

Subsequently, the first differentiation section 71 differentiates the absolute value signal S62 generated by the absolute value process section 62, thereby generating a first differentiation signal S72.

Subsequently, the multiplication section 91 multiplies the first differentiation signal S72 with the second differentiation signal S81, thereby generating a nonlinear process signal S12.

Embodiment 2

The encoding device 200a described in Embodiment 1 is of a configuration in which the encoded signal S220 is outputted by encoding, in the encoding process section 220, just the high-frequency-free signal S210 in which the high frequency component of the original signal SR is removed. In the decoding process section 310 of the decoding device 300a, the decoding process is carried out based on just the encoded signal S220; the reconstructed image thus indicated by the decoded signal S310 outputted from the decoding process section 310 inevitably becomes deteriorated as compared to the original image indicated by the original signal SR.

In a case in which a degree of reducing the transmission rate of the signal to be transmitted through the transmission path 700 is allowed to be decreased in degree, the configuration may be designed to encode the original signal SR instead of the high-frequency-free signal S210 every predetermined period, in order to minimize the deterioration of the reconstructed image. For example, the configuration may be one in which the original signal SR is encoded one frame per several frames.

The present embodiment describes a mode in which the original signal SR is encoded instead of the high-frequency-free signal S210, every predetermined period on the sending side.

Described below is an embodiment of the present invention, with reference to FIG. 16 to FIG. 18. The encoding device 200 according to the present embodiment is referred to as an encoding device 200c. Moreover, the decoding device 300 according to the present embodiment is referred to as a decoding device 300c.

For easy explanation, members having identical functions as the members shown in Embodiment 1 are provided with identical reference signs, and their descriptions are omitted unless particularly required.

(Configuration of Encoding Device and Decoding Device)

The following description explains configuration examples of the encoding device 200c and the decoding device 300c, with reference to FIG. 16 and FIG. 17. FIG. 16 and FIG. 17 are block diagrams showing configuration examples of the encoding device 200c and the decoding device 300c, respectively.

First described is the configuration of the encoding device 200c. As shown in FIG. 16, the encoding device 200c includes an LPF 210, a signal switching section 240, and an encoding process section (encoding means) 221.

The signal switching section 240 is a switch that switches a connection of a signal line to which input is provided to the encoding process section 221. The signal switching section 240, depending on an instruction from the encoding process section 221, switches between whether to connect a connection point Out1 with a connection point In11 or with a connection point In12. In the present embodiment, when the connection point Out1 connects with the connection point In12, the high-frequency-free signal S210 is inputted into the encoding process section 221, whereas when the connection point Out1 is connected with the connection point In11, the original signal SR is inputted into the encoding process section 221.

The encoding process section 221 encodes a signal received via the signal switching section 240. The signal outputted from the encoding process section 221 is referred to as an encoded signal S221. In the present embodiment, the encoded signal S221 includes a signal in which the original signal SR is encoded and a signal in which the high-frequency-free signal S210 is encoded.

The encoding process section 221 and a decoding process section 320 later described serve as a pair, and the encoding process section 221 is designed so as to output the encoded signal S221 that is decodable by the decoding process section 320.

Moreover, in the case in which a video image is to be encoded, the encoding process section 221 carries out compression encoding, by use of the commonly known inter-frame predictive coding. Furthermore, the encoding process section 221 makes a motion vector, used for the decoding process section 320 to carry out motion compensation, be included in the encoded signal S221, and outputs such an encoded signal S221.

Furthermore, the encoding process section 221 instructs the signal switching section 240 with which of the connection point In11 and connection point In12 the connection point Out1 is to be connected. More specifically, the encoding process section 221 usually instructs to connect the connection point Out1 with the connection point In12, whereas the encoding process section 221 instructs to connect the connection point Out1 with the connection point In11 every predetermined period (hereinafter, predetermined period T1).

The predetermined period T1 is set as appropriate in accordance with encoding efficiency and image quality of the reconstructed image. In the present embodiment, for example when the encoding efficiency is to be improved, the predetermined period T1 is set so that frames in which the high-frequency-free signal S210 is encoded is large in number and frames in which the original signal SR is encoded is small in number (one example is, for every predetermined several hundred frames in which the high-frequency-free signal S210 is encoded, a subsequent one frame encodes the original signal SR).

On the other hand, in a case in which the image quality of the reconstructed image is given weight, the predetermined period T1 is sufficiently set so that the number of frames in which the original signal SR is encoded is large in number (one example is, every time a predetermined several frames of the high-frequency-free signal S210 is encoded, the subsequent one frame has the original signal SR be encoded therein).

The encoding process section 221 multiplexes, to the encoded signal S221, information (hereinafter, referred to as encoding information E1) indicative of whether or not the encoded signal S221 encodes a signal inputted via the connection point In11 of the signal switching section 240 (hereinafter, referred to as input signal A11) or encodes a signal inputted via the connection point In12 (hereinafter, referred to as input signal A12). In the present embodiment, the input signal A11 is the original signal SR, and the input signal A12 is the high-frequency-free signal S210.

Next described is the configuration of the decoding device 300c. The decoding device 300c, as shown in FIG. 17, includes a decoding control section (decoding means) 311 and a sharpening process section 100.

First described is the decoding control section 311. The decoding control section 311 includes a decoding process section 320 and a signal reconfiguring section 330. The signal outputted from the decoding control section 311 is referred to as a decoding result signal (decoded signal) S311. The decoding result signal S311 is a signal indicative of a reconstructed image that corresponds to the original image.

As described above, the decoding process section 320 decodes the encoded signal S221 outputted from the encoding process section 221 (decoding step). When a video is to be decoded, the decoding process section 320 carries out inter-frame prediction with use of the motion vector included in the encoded signal S221, to carry out motion compensation thereof.

A signal outputted from the decoding process section 320 is referred to as a decoded signal S320. As described above, in the present embodiment, the encoded signal S221 includes the signal in which the original signal SR is encoded and the signal in which the high-frequency-free signal S210 is encoded. Hence, the decoded signal S320 includes a signal in which the signal in which the original signal SR is encoded is decoded (hereinafter referred to as decoded original signal) and a signal in which the signal in which the high-frequency-free signal S210 is encoded is decoded (hereinafter, referred to as decoded high-frequency-free signal).

Furthermore, the decoding process section 320 instructs, to a first signal switching section 331 (later described) included in the signal reconfiguring section 330, whether to connect the connection point Out2 with a connection point In21 or with a connection point In22. Moreover, the decoding process section 320 instructs, to a second signal switching section 334 (later described), whether to connect a connection point Out3 with a connection point In31 or with a connection point In32.

More specifically, the decoding process section 320 initially extracts the encoding information E1 included in the encoded signal S221. In a case in which the encoding information E1 indicates that the encoded signal S221 is a signal in which the input signal A11 (i.e. original signal SR) is encoded, the decoding process section 320 instructs the first signal switching section 331 to connect the connection point Out2 with the connection point In21, and instructs the second signal switching section 334 to connect the connection point Out3 with the connection point In31.

On the other hand, in a case in which the encoding information E1 indicates that the encoded signal S221 is a signal in which the input signal A12 (i.e. high-frequency-free signal S210) is encoded, the decoding process section 320 instructs the first signal switching section 331 to connect the connection point Out2 with the connection point In22, and instructs the second signal switching section 334 to connect the connection point Out3 with the connection point In32.

Next described is the signal reconfiguring section 330. The signal reconfiguring section 330, in brief, outputs a decoding result signal (decoded signal) S311 indicative of a reconstructed image, on the basis of the decoded original signal and the decoded high-frequency-free signal each included in the decoded signal S320. More specifically, in the present embodiment, when the decoded signal S320 is the decoded original signal, the decoded original signal is outputted as it is, as the decoding result signal S311. On the other hand, when the decoded signal S320 is the decoded high-frequency-free signal, the decoded high-frequency-free signal is added to a signal of a decoding result signal S311, corresponding to a frame immediately before, having been subjected to motion compensation, to output a decoding result signal S311 that corresponds to a latest frame.

In order to carry out the foregoing process, the signal reconfiguring section 330 includes a first signal switching section 331, a frame memory section 332, a motion compensation section 333, a second signal switching section 334, and an addition section 335.

The first signal switching section 331 is a switch for switching over a connection of a signal line from which input is provided to the frame memory section 332. The first signal switching section 331, in response to an instruction from the decoding process section 320, switches over between the connection point Out2 being connected to the connection point In21 or being connected to the connection point In22. When the connection point Out2 is connected to the connection point In21, the frame memory section 332 receives the decoded signal S320, whereas when the connection point Out2 is connected to the connection point In22, the frame memory section 332 receives the decoding result signal S311.

The connection point Out2 is connected with the connection point In21 when the encoding information E1 extracted by the decoding process section 320 indicates that the encoded signal is a signal in which the input signal A11 (i.e. original signal SR) is encoded, and the decoding process section 320 outputs the decoded original signal as the decoded signal S320. Hence, when the connection point Out2 is connected with the connection point In21, the decoded original signal is received by the frame memory section 332.

The frame memory section 332 holds one frame worth of the signal received via the first signal switching section 331. Hence, the frame memory section 332 holds one frame worth of one of the decoded original signal and the decoding result signal S311. Furthermore, the frame memory section 332 outputs the signal thus held to the motion compensation section 333, frame by frame. The signal outputted from the frame memory section 332 is referred to as a memory signal S332.

The motion compensation section 333 carries out motion compensation based on a motion vector to a frame immediately before, which frame is indicated by the memory signal S332, to calculate a latest frame. The motion vector used for the motion compensation is the motion vector used for the motion compensation carried out in the decoding process section 320, which motion vector is received from the decoding process section 320. Hence, the motion compensation section 333 includes, as appropriate, a delay element which adjusts a timing between the memory signal S332 and the motion vector received from the decoding process section 320. A signal outputted from the motion compensation section 333 is referred to as a motion compensation signal S333.

The second signal switching section 334 is a switch that switches a connection of a signal line from which input is provided to the addition section 335. The second signal switching section 334, in response to an instruction from the decoding process section 320, switches the connection of the connection point Out3 between a connection with the connection point In31 or a connection with the connection point In32. In the present embodiment, the motion compensation signal S333 is inputted to the addition section 335 when the connection point Out3 is connected to the connection point In32, whereas when the connection point Out3 is connected to the connection point In31, nothing is inputted into the addition section 335.

The addition section 335 adds a signal received from the second signal switching section 334 to the decoded signal S320, to output the decoding result signal S311. Accordingly, when the connection point Out3 is connected with the connection point In32 in the second signal switching section 334, the decoded signal S320 is added to the motion compensation signal S333, to output the decoding result signal S311. On the other hand, when the connection point Out3 is connected with the connection point In31 in the second signal switching section 334, the decoded signal S320 is outputted as it is, as the decoding result signal S311.

The addition section 335 includes a delay element as appropriate, for adjusting a timing between a signal received from the second signal switching section 334 and the decoded signal S320.

As from the configuration described above, in the present embodiment, the decoding control section 311 exhibits as follows: (1) when the encoding information E1 indicates that the encoded signal S221 is a signal in which the input signal A11 (i.e. original signal SR) is encoded, the decoding control section 311 (i) outputs a decoded original signal as the decoded signal S320, (ii) holds the decoded original signal in the frame memory section 332 via the first signal switching section 331, and (iii) outputs the decoded original signal as the decoding result signal S311 via the addition section 335; (2) on the other hand, when the encoding information E1 indicates that the encoded signal S221 is a signal in which the input signal A12 (i.e. high-frequency-free signal S210) is encoded, the decoding control section 311 (i) outputs a decoded high-frequency-free signal as the decoded signal S320, and (ii) outputs a decoding result signal S311 by adding a motion compensation signal S333 generated by carrying out motion compensation to the memory signal S332 outputted from the frame memory section 332 in the motion compensation section 333, to the decoded high-frequency-free signal, at the addition section 335. Thereafter, in order to have the decoding result signal S311 be subjected to the motion compensation in the motion compensation section 333 subsequently, the decoding result signal S311 is held in the frame memory section 332 via the first signal switching section 331.

By repeating the foregoing processes, the decoding control section 311 outputs the decoding result signal S311 indicative of a reconstructed image that corresponds to the original image.

Finally, the decoding device 300c is a configuration in which the sharpening process section 100 is provided subsequently to the decoding control section 311, and the decoding result signal S311 outputted from the decoding control section 311 serves as a signal input of the sharpening process section 100. Therefore, the decoding device 300c carries out a sharpening process to the decoding result signal S311 in the sharpening process section 100 based on nonlinear operation. That is to say, the sharpening process section 100 of the decoding device 300c sharpens a reconstructed image indicated by the decoding result signal S311.

(Effect Attained by Foregoing Configuration)

The encoding device 200c encodes the original signal SR instead of the high-frequency-free signal S210 per predetermined period. The decoding device 300c outputs, by the decoding control section 311, a signal in which a decoded high-frequency-free signal is added to a signal in which a signal indicative of a frame immediately before is subjected to motion compensation, as the decoding result signal S311, and further outputs, every predetermination period, the decoded original signal as it is, as the decoding result signal S311. Hence, the decoding device 300c can reduce the deterioration in the reconstructed image more than the encoding device 200a described in Embodiment 1. In particular, the decoding device 300c is effective in reducing blur caused by a lack of high-definition signals.

(Modification)

The decoding device 300c described above is of a configuration which carries out the sharpening process to the entirety of the decoding result signal S311, in the sharpening process section 100. The configuration alternatively may be one which suitably switches between whether or not to carry out the sharpening process to the decoding result signal S311. For example, the decoding device 300c may be designed so that when the decoded original signal is outputted as it is as the decoding result signal S311, no sharpening process is carried out to the decoding result signal S311, whereas when the decoding result signal S311 is outputted with use of the decoded high-frequency-free signal, the sharpening process is carried out to the decoding result signal S311. This makes it possible to carry out the sharpening process to not the entire decoding result signal S311, but just to parts of the decoding result signal S311 which are considered as being deteriorated.

The foregoing configuration is described with reference to FIG. 18. FIG. 18 is a block diagram showing a configuration example of a decoding device 300d, which is a modification of the decoding device 300c.

As shown in FIG. 18, the decoding device 300d includes a decoding control section (decoding means) 312, a sharpening process section 100, and an output switching section 340. A signal outputted from the decoding control section 312 is referred to as a decoding result signal (decoded signal) S312. The decoding result signal S312 is a signal indicative of a reconstructed image that corresponds to the original image.

The output switching section 340 is a switch that switches a signal line from which output is provided from the decoding device 300d. The output switching section 340, in response to an instruction from the decoding process section 321 of the decoding control section 312, switches between whether to connect the connection point Out4 with the connection point In41 or with the connection point In42. When the connection point Out4 is connected with the connection point In42, the decoding device 300d outputs the output signal of the sharpening process section 100. On the other hand, when the connection point Out4 is connected with the connection point In41, the decoding device 300d outputs the decoding result signal S312.

The decoding control section 312 is identical in configuration to the decoding control section 311, except that the decoding process section 320 is replaced with a decoding process section 321. The decoding process section 321 includes all functions capable by the decoding process section 320. The decoding process section 321 further has a function to instruct the output switching section 340 of whether to connect the connection point Out4 with the connection point In41 or with the connection point In42.

More specifically, the decoding process section 321 extracts the encoding information E1 included in the encoded signal S221, and (1) in a case in which the encoding information E1 indicates that the encoded signal S221 is a signal in which the input signal A11 (i.e. original signal SR) is encoded, the decoding process section 321 instructs to the output switching section 340 to connect the connection point Out4 with the connection point In41. Consequently, when the decoded original signal is outputted as the decoding result signal S312, the decoding result signal S312 as it is serves as a signal that is outputted from the decoding device 300d.

On the other hand, (2) in a case in which the encoding information E1 indicates that the encoded signal S221 is a signal in which the input signal A12 (i.e. high-frequency-free signal S210) is encoded, the decoding process section 321 instructs the output switching section 340 to connect the connection point Out4 with the connection point In42. Accordingly, when the decoding result signal S312 is outputted from the signal reconfiguring section 330 with use of the decoded high-frequency-free signal, a signal having been subjected to the sharpening process in the sharpening process section 100 serves as the signal to be outputted from the decoding device 300d.

According to the configuration, it is possible to carry out the sharpening process to not the entirety of the decoded signal but just to a part of the decoding result signal S312 in which the degree of deterioration is considered as great (i.e. when the decoding result signal S312 is outputted with use of the decoded high-frequency-free signal).

Embodiment 3

The encoding device 200c described above is of a configuration in which the LPF 210 and the signal switching section 240 are used to encode any one of the original signal SR and the high-frequency-free signal S210. However, the high-frequency-free signal S210 is a signal in which a high frequency component is removed from the original signal SR by LPF, therefore a signal corresponding to an outline part (edge) in the original image is small in amount. Hence, there is a case in which the outline part (edge) cannot be sufficiently reconstructed, in a reconstructed image indicated by a signal decoded by the decoding device 300c.

Accordingly, the present embodiment describes a configuration in which the outline part (edge) of the reconstructed image can be sufficiently reconstructed while the transmission rate of a signal to be transmitted through the transmission path 700 is held down.

One embodiment of the present invention is described below, with reference to FIG. 17, FIG. 19 and FIG. 20. The encoding device 200 according to the present embodiment is referred to as an encoding device 200d. Moreover, a decoding device 300 according to the present embodiment is referred to as a decoding device 300e.

For easy explanation, members having identical functions as those shown in Embodiments 1 and 2 are provided with identical reference signs, and unless particularly required, explanations of these members are omitted.

(Configuration of Encoding Device and Decoding Device)

Described below is a configuration example of the encoding device 200d and the decoding device 300e, with reference to FIG. 19 and FIG. 17. FIG. 19 and FIG. 17 are block diagrams showing configuration examples of the encoding device 200d and the decoding device 300e, respectively.

First described is the configuration of the encoding device 200d. As illustrated in FIG. 19, the encoding device 200d includes an LPF (high-frequency component removing means) 210, a sharpening process section 100, a subtraction section (subtraction means) 250, a signal switching section 240, and an encoding process section 221. The LPF 210, the sharpening process section 100, and the subtraction section 250 are collectively called a frequency component extraction section (frequency component extracting means) 230.

The sharpening process section 100 of the encoding device 200d is provided subsequently to the LPF 210, and outputs a signal in which a sharpening process is carried out to the high-frequency-free signal S210 outputted from the LPF 210 (hereinafter, referred to also as harmonics of the high-frequency-free signal S210).

The subtraction section 250 subtracts harmonics of the high-frequency-free signal S210 from the original signal SR. The subtraction section 250 includes, as appropriate, a delay element for adjusting a timing between the original signal SR and the harmonics of the high-frequency-free signal S210.

A signal outputted from the subtraction section 250 is referred to as a difference signal (frequency component extraction signal) S250. The difference signal S250 can be said as a signal corresponding to an outline part (edge) included in the original image that the original signal SR indicates.

The LPF 210, the signal switching section 240, and the encoding process section 221 are capable of the functions described in Embodiment 2.

However, in the present embodiment, when the connection point Out1 is connected with the connection point In12 in the signal switching section 240, the encoding process section 221 receives the difference signal S250, whereas when the connection point Out1 is connected with the connection point In11, the encoding process section 221 receives the original signal SR. Hence, in the case of the present embodiment, the encoded signal S221 includes a signal in which the difference signal S250 is encoded and a signal in which the original signal SR is encoded.

Moreover, in the present embodiment, the input signal A11 is the original signal SR, and the input signal A12 is the difference signal S250.

Next described is a configuration of the decoding device 300e. The decoding device 300e has identical configurations to the decoding device 300c of Embodiment 2 shown in FIG. 17.

In the present embodiment, when the extracted encoding information E1 (1) indicates that the encoded signal S221 is a signal in which the input signal A11 (i.e. original signal SR) is encoded, the decoding process section 320 instructs the first signal switching section 331 to connect the connection point Out2 with the connection point In21, and instructs the second signal switching section 334 to connect the connection point Out3 with the connection point In31.

On the other hand, when the encoding information E1 (2) indicates that the encoded signal S221 is a signal in which the input signal A12 (i.e. difference signal S250) is encoded, the decoding process section 320 instructs the first signal switching section 331 to connect the connection point Out2 with the connection point In22 and instructs the second signal switching section 334 to connect the connection point Out3 with the connection point In32.

As described above, in the case of the present embodiment, the encoded signal S221 includes a signal in which the original signal SR is encoded and a signal in which the difference signal S250 is encoded. Therefore, the decoded signal S320 outputted from the decoding process section 320 includes a signal in which the signal in which the original signal SR is encoded is decoded (hereinafter referred to as decoded original signal) and a signal in which the signal in which the difference signal S250 is encoded is decoded (hereinafter referred to as decoded difference signal).

Further, in the present embodiment, when the decoded signal S320 is the decoded original signal, the signal reconfiguring section 330 outputs the decoded original signal as it is, as the decoding result signal S311. On the other hand, when the decoded signal S320 is the decoded difference signal, a decoding result signal S311 corresponding to a latest frame is outputted, by adding the decoded difference signal to a signal in which motion compensation is carried out to the decoding result signal S311 corresponding to a frame immediately before.

More specifically, when the decoded signal S320 is the decoded original signal, the decoded original signal is held in the frame memory section 332 via the first signal switching section 331, and the decoded original signal is outputted as the decoding result signal S311 via the addition section 335. On the other hand, when the decoded signal S320 is the decoded difference signal, first in the addition section 335, the decoded difference signal is added to a motion compensation signal S333 generated by carrying out, in a motion compensation section 333, a motion compensation to a memory signal S332 outputted from the frame memory section 332, to generate the decoding result signal S311. Thereafter, the decoding result signal S311 is outputted. The decoding result signal S311 is held in the frame memory section 332 via the first signal switching section 331, to carry out motion compensation by the motion compensation section 333 subsequently.

Thereafter, a reconstructed image indicated by the decoding result signal S311 is sharpened by the sharpening process section 100.

(Effect Attained by Foregoing Configuration)

As described above, the encoding device 200d generates a difference signal S250 by subtracting from the original signal SR a signal in which a sharpening process is carried out to the high-frequency-free signal S210 in the sharpening process section 100. Thereafter, encoding is carried out by switching between the original signal SR and the difference signal S250. Hence, with the encoding device 200d, it is possible to reduce the transmission rate of a signal to be transmitted through the transmission path 700. The reduction of the transmission rate allows for reducing costs required for the data transmission.

With the decoding device 300e, the contents indicated by the decoding result signal S311 is sharpened by the sharpening process section 100; in a case in which the contents is of image, image blur is minimized in the image which has been subjected to the decoding, thereby allowing for improving its resolution. Moreover, the contents is similarly sharpened in a case in which the contents is of audio, which allows for making the sound quality clear.

Therefore, according to the foregoing configuration in which encoding is carried out in the encoding device 200d and decoding is carried out in the decoding device 300e, such an effect is attained that a transmission rate of a signal to be transmitted through the transmission path 700 is reduced while contents having been subjected to decoding on the receiving side is minimized in unsharpness.

(Modification 1)

The encoding device 200d described above is designed to output, with use of the LPF 210, the sharpening process section 100, and the subtraction section 250, the difference signal S250 as a signal corresponding to an outline part (edge) included in the original image that is indicated by the original signal SR. However, the signal corresponding to the outline part (edge) included in the original image may be generated by other methods. The simplest configuration is to pass the original signal SR through a high-pass filter (hereinafter, HPF), to generate the signal corresponding to the outline part (edge) included in the original image.

Below describes the foregoing configuration, with reference to FIG. 20. FIG. 20 is a block diagram showing a configuration example of an encoding device 200e, which is a modification of the encoding device 200d.

As shown in FIG. 20, the encoding device 200e includes an HPF (frequency component extracting means) 215 as a replacement of the LPF 210, the sharpening process section 100, and the subtraction section 250 of the encoding device 200d.

The HPF 215 is a commonly known high-pass filter, and removes, from the original signal SR, a low-frequency component included in frequency components of the original signal SR. The HPF 215 may be a high-pass filter that can be adjustable in its frequency characteristics (so-called adaptive high-pass filter). The signal outputted from the HPF 215 is referred to as a low-frequency-free signal (frequency component extraction signal) S215. The low-frequency-free signal S215 is a signal corresponding to an outline part (edge) included in the original image that is indicated by the original signal SR.

As described above, similarly with the encoding device 200d, the encoding device 200e carries out encoding by switching between the original signal SR and a part of frequency components included in the original signal SR, with a simple configuration.

However, since the low-frequency-free signal S215 generated in the encoding device 200e is simply a signal that removes the low-frequency component from the original signal SR, the low-frequency-free signal S215 includes a high frequency component, which is in the vicinity of Nyquist frequency of the original signal SR. Accordingly, the low-frequency-free signal S215 includes many noises and fine edges than the difference signal S250 generated by the encoding device 200d, and becomes greater in data amount than the difference signal S250.

Therefore, the encoding device 200e can increase the transmission rate of the signal to be transmitted through the transmission path 700 more than that of the encoding device 200d, and in a case in which reduction of the circuit scale and cost is given more weight at the sacrifice of a slightly unsharp image upon decoding, the encoding device 200e is more suitably used than the encoding device 200d.

(Modification 2)

The decoding device 300e described above has a configuration in which a sharpening process is carried out to an entirety of the decoding result signal S311, in the sharpening process section 100. However, the configuration can be one in which whether or not the sharpening process is carried out to the decoding result signal S311 is switched as appropriate. For example, the configuration may be one in which when the decoded original signal serves as the decoding result signal S311 as it is, no sharpening process is carried out to the decoding result signal S311, whereas when the decoding result signal S311 is outputted based on the decoded difference signal, the sharpening process is carried out to the decoding result signal S311. This allows for carrying out the sharpening process to not the entire decoding result signal S311 but just to a part of the decoding result signal S311 that is considered as being deteriorated (i.e. when the decoding result signal S311 is one based on the decoded difference signal).

The foregoing configuration is identical to the decoding device 300d, and thus explanation thereof is omitted here.

Embodiment 4

A degree of deterioration of the contents which has been subjected to the decoding differs as appropriate depending on variation of a transmission band in the transmission path 700 and on the contents itself. Hence, the data amount of the difference signal S250 may be adjusted by adjusting the frequency characteristics of the LPF 210 and the high frequency component extracting section 11.

The present embodiment describes a mode in which the contents prior to encoding is compared with the contents reconstructed after the decoding, and the frequency characteristics of the LPF 210 and the high frequency component extracting section 11 are adjusted in accordance with the comparison results.

One embodiment of the present invention is described below with reference to FIG. 21 and FIG. 22. The encoding device 200 according to the present embodiment is referred to as an encoding device 200f. Moreover, the decoding device 300 according to the present embodiment is referred to as a decoding device 300f.

For easy explanation, members having identical functions as those shown in Embodiments 1 through 3 are provided with identical reference signs, and their explanations have been omitted.

(Configuration of Encoding Device and Decoding Device)

The following describes configuration examples of the encoding device 200f and the decoding device 300f, with reference to FIG. 21 and FIG. 22. FIG. 21 and FIG. 22 are block diagrams showing configuration examples of the encoding device 200f and the decoding device 300f, respectively.

First described is the configuration of the encoding device 200f. As shown in FIG. 21, the encoding device 200f includes an LPF 211, a sharpening process section 101 (hereinafter referred to as sharpening process section 101A) provided subsequently to the LPF 211, a subtraction section 250, a signal switching section 240, an encoding process section (encoding means) 222, a decoding control section 313, a sharpening process section 101 (hereinafter, referred to as sharpening process section 101B) provided subsequently to the decoding control section 313, the subtraction section 280, and the frequency component control section 290. When the sharpening process sections 101A and 101B, and a sharpening process section 101C later described are not distinguished from each other, these members will simply be referred to as "sharpening process section 101".

The sharpening process section 101 has an identical configuration as the sharpening process section 100, except for the following difference. The difference is that frequency characteristics of the high frequency component extracting section 11 are adjustable (i.e. increase and decrease in high frequency components extracted by the high frequency component extracting section 11 is adjustable) in response to an instruction received from outside. More specifically, a filter coefficient is adjustable. Explanation is omitted regarding the configuration of the sharpening process section 101.

The LPF 211 is a low-pass filter whose frequency characteristics are adjustable (so-called adaptive low-pass filter) in response to an instruction from outside. More specifically, the filter coefficient can be adjusted. That is to say, the LPF 211 allows for adjusting the increasing and decreasing of the high frequency components to be removed. The signal outputted from the LPF 211 is referred to as a high-frequency-free signal S211.

The sharpening process section 101A is provided subsequently to the LPF 211, and outputs a signal in which a sharpening process is carried out to the high-frequency-free signal S211 that is outputted from the LPF 211 (hereinafter referred to also as harmonics of the high-frequency-free signal S211).

The encoding process section 222 has functions similar to the encoding process section 221. A signal outputted from the encoding process section 222 is referred to as an encoded signal S222. The encoding process section 222 is associated with (a) the decoding process section 320 of the decoding control section 313 and (b) a decoding process section 322 of a decoding control section (decoding means) 314 later described, and the encoding process section 222 is configured to output an encoded signal S222 decodable by the decoding process section 320 of the decoding control section 314 and by the decoding process section 322 of the decoding control section 314.

The decoding control section 313 has an identical configuration to that of the decoding control section 311 described in FIG. 17, and includes the decoding process section 320 and the signal reconfiguring section 330. A signal outputted from the decoding control section 313 is described as a decoding result signal S313.

The sharpening process section 101B is provided subsequent to the decoding control section 313, and outputs a signal in which the sharpening process is carried out to the decoding result signal S313 outputted from the decoding control section 313 (hereinafter, described also as harmonics of the decoding result signal S313).

The subtraction section 280 subtracts the harmonics of the decoding result signal S313 from the original signal SR. A signal outputted from the subtraction section 280 is described as a difference signal S280. The subtraction section 280 includes, as appropriate, a delay element for adjusting a timing between the original signal SR and the harmonics of the decoding result signal S313.

The frequency component control section 290 controls the LPF 211 and the high frequency component extracting section 11 of the sharpening process section 101A and the sharpening process section 101B, so that a difference between the image indicated by the harmonics of the decoding result signal S313 and the original image is made small, and adjusts the frequency characteristics.

Hence, the frequency component control section 290 first compares a total value of an absolute value of the difference signal S280 (hereinafter referred to as total SU) with a predetermined threshold. The total SU can be said as a value indicative of a difference between the image indicative of the harmonics of the decoding result signal S311 and the original image.

The image indicated by the harmonics of the decoding result signal S313 is an image identical to an image indicated by the harmonics of the decoding result signal (decoded signal) S314 decoded by the decoding device 300f later described. Hence, the total SU can be said as a value indicative of a difference between the reconstructed image and the original image. Accordingly, the greater the value of the total SU, the greater the difference between the reconstructed image and the original image.

As a result of the comparison, when the total SU is greater than a predetermined threshold, the frequency component control section 290 controls the LPF 211, the sharpening process section 101A, and the sharpening process section 101B so that the difference between the reconstructed image and the original image is made small. Namely, the frequency component control section 290 controls so that the data amount of the difference signal S250 increases. More specifically, the frequency component control section 290 carries out the following (A) or (B), or both of the (A) and (B): (A) adjust frequency characteristics of the LPF 211 so as to reduce the high-frequency components removed by the LPF 211, (B) adjust frequency characteristics of the high-frequency component extracting section 11 of the sharpening process sections 101A and 101B so that the high-frequency components extracted by the sharpening process sections 101A and 101B are increased.

On the other hand, when the total SU is not more than a predetermined value as a result of the comparison, the frequency component control section 290 controls the LPF 211, the sharpening process section 101A, and the sharpening process section 101B so that the data amount of the difference signal S250 is made small. More specifically, the frequency component control section 290 carries out the following (C) or (D), or both of the (C) and (D): (C) adjust frequency characteristics of the LPF 211 so that the high-frequency components removed by the LPF 211 are increased in amount, or (D) adjust frequency characteristics of the high-frequency component extracting section 11 of the sharpening process sections 101A and 101B so that the high-frequency components extracted by the sharpening process sections 101A and 101B are reduced.

The frequency characteristics of the high frequency component extracting section 11 of the sharpening process sections 101A and 101B are adjusted to be identical to each other.

Moreover, adjusted details of the frequency characteristics of the high-frequency component extracting section 11 included in the sharpening process sections 101A and 101B (hereinafter referred to as frequency characteristics adjusted information F1) is sent to the decoding device 300f. For example, the frequency characteristics adjusted information F1 is sent to the decoding device 300f via the encoding process section 222, upon multiplexing with the encoded signal S222.

Next described is a configuration of the decoding device 300f. The decoding device 300f includes a decoding control section 314, and a sharpening process section 101 (hereinafter referred to as sharpening process section 101C) provided subsequently to the decoding control section 314.

The decoding control section 314 has an identical configuration as the decoding control section 311 except that the decoding process section 320 is replaced with the decoding process section 322. The decoding process section 322 has the same functions as the decoding process section 320, except for the following difference. The difference is that the decoding process section 322 adjusts an increase and decrease in the high-frequency component extracted by the sharpening process section 101C provided subsequently to the decoding control section 314, in accordance with the frequency characteristics adjusted information F1 received from the encoding device 200f. More specifically, the difference is that the decoding process section 322 adjusts the frequency characteristics of the high-frequency component extracting section 11 included in the sharpening process section 101C. The details of the adjustment is identical to that of the frequency characteristics of the high-frequency component extracting section 11 included in the sharpening process sections 101A and 101B.

The signal outputted from the decoding control section 314 is described as a decoding result signal S314. The decoding result signal S314 is a signal indicative of a reconstructed image that corresponds to the original image.

The decoding device 300f provides the sharpening process section 101C subsequently to the decoding control section 314; the decoding result signal S314 outputted from the decoding control section 314 serves as a signal input of the sharpening process section 101C. Hence, the decoding device 300f carries out a sharpening process to the decoding result signal S314 in the sharpening process section 101C, based on nonlinear operation. Namely, the sharpening process section 100 of the decoding device 300f sharpens a reconstructed image indicated by the decoding result signal S314.

(Effect Attained by Foregoing Configuration)

As described above, the encoding device 200f includes functions similar to the decoding device 300f, and is capable of generating a reconstructed image decoded by the decoding device 300f and comparing its difference from the original image. Thereafter, in accordance with the comparison result, the data amount of the difference signal S250 is to be adjusted. Moreover, the amount adjusted by the encoding device 200f is transmitted to the decoding device 300f so as to reflect the amount into the sharpening process carried out by the decoding device 300f. As a result, it is possible to adjust image quality of the reconstructed image decoded by the decoding device 300f and to adjust the data amount to be transmitted through the transmission path 700.

Accordingly, in the transmission system including the encoding device 200f and the decoding device 300f, it is possible to suitably adjust the degree of deterioration of the decoded contents and the data amount to be transmitted through the transmission path 700.

(Modification 1)

In order to minimize the data amount to be transmitted through the transmission path 700, the transmission system may be configured in such a manner that the encoding device further carries out signal decimation before carrying out the encoding, and that interpolation of the signal is carried out after the signal is decoded.

This configuration is described below, with reference to FIG. 23 and FIG. 24. FIG. 23 and FIG. 24 are block diagrams respectively showing configuration examples of an encoding device 200g, which is a modification of the encoding device 200f, and a decoding device 300g, which is a modification of the decoding device 300f.

As shown in FIG. 23, the encoding device 200g includes an identical configuration as that of the encoding device 200f, and further includes a down sampler 270 disposed between the signal switching section 240 and the encoding process section 222, and also an up sampler 271 disposed between the decoding control section 313 and the sharpening process section 101B.

Moreover, as shown in FIG. 24, the decoding device 300g has an identical configuration as the decoding device 300f, however further includes an up sampler 371 disposed between the decoding control section 314 and the sharpening process section 101C.

(Modification 2)

Embodiment 3 described above, with reference to FIG. 20 as a modification of the encoding device, describes the configuration that generates a signal corresponding to an outline part (edge) included in the original image, by passing the original signal SR through the HPF. The present embodiment also may include an HPF 291 (not illustrated) instead of the LPF 211, the sharpening process section 101A, and the subtraction section 250 of the encoding device 200f. The HPF 291 is a high-pass filter that can adjust frequency characteristics (so-called adaptive high-pass filter), in response to an instruction received from outside. Namely, the HPF 291 can adjust the increase and reduction in the low-frequency component to be reduced.

The frequency characteristics of the HPF 291 is to be adjusted so that when the total SU is greater than the predetermined threshold the frequency component control section 290 controls to increase the low-frequency component to be removed by the HPF 291, and that the frequency component control section 290 reduces the low-frequency component to be removed by the HPF 291 when the total SU is not more than the predetermined threshold.

(Modification 3)

The decoding device 300f described above is of a configuration in which the sharpening process is carried out in the sharpening process section 101C to the entirety of the decoding result signal S313, however this configuration may be one in which whether or not the sharpening process is to be carried out to the decoding result signal S313 is switched as appropriate. For example, when the decoded original signal is outputted as it is as the decoding result signal S313, no sharpening process is carried out to the decoding result signal S313, whereas when the decoding result signal S313 based on the decoded difference signal is outputted, the sharpening process is carried out to the decoding result signal S313. This allows for carrying out a sharpening process to not the entire decoding result signal S313, but to just a part of the decoding result signal S313 in which it is considered as being deteriorated (i.e. when the decoding result signal S313 is outputted based on the decoded difference signal).

The configuration that carries out the switching over is identical to that of the decoding device 300d, and thus description thereof is omitted here.

Additional Matter

Finally, the functions of the encoding device 200 and the decoding device 300 may be realized by way of hardware or software as executed by a CPU (central processing unit) as follows:

In a case of realizing by way of software, the encoding device 200 and the decoding device 300 (in particular, the sharpening process sections 100 and 101, the decoding control sections 311 through 314, and the frequency component control section 290) each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the encoding device 200 and the decoding device 300 a computer-readable storage medium containing control program codes (executable program, intermediate code program, or source program) for the encoding device 200 and the decoding device 300, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The encoding device 200 and decoding device 300 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (registered trademark), 802.11 wireless, HDR, mobile telephone network, satellite line, or terrestrial digital network. The present invention encompasses a carrier wave or data signal transmission in which the program code is embodied electronically.

In the present specification, "means" does not necessary denote physical means, and also includes cases in which functions of the means are realized by way of software. Furthermore, a function of one means may be realized by two or more physical means, or alternatively, functions of two or more means may be realized by one physical means.

As described above, a decoding device according to the present invention is a decoding device that outputs an output signal by receiving, as an input, an encoded signal including a signal in which an original signal is encoded, the original signal being indicative of contents of at least one of image and audio, and the output signal being indicative of the contents, the decoding device including: decoding means for decoding the encoded signal, to generate a decoded signal; low-frequency component removing means for removing, from frequency components of the decoded signal, a low-frequency component at least including a direct current component, to generate a low-frequency-free signal; nonlinear processing means for generating a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0; and addition means for adding the nonlinear process signal to the decoded signal, to generate an addition signal, the addition signal being outputted as the output signal.

Moreover, a control method according to the present invention of a decoding device is a method of controlling a decoding device that outputs an output signal by receiving, as an input, an encoded signal including a signal in which an original signal is encoded, the original signal being indicative of contents of at least one of image and audio, the method including: decoding the encoded signal, to generate a decoded signal; removing, from frequency components of the decoded signal, a low-frequency component at least including a direct current component, to generate a low-frequency-free signal; generating a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0; and adding the nonlinear process signal to the decoded signal, to generate an addition signal, the addition signal being outputted as the output signal.

This allows for outputting, as an output signal, a signal in which a nonlinear process is carried out to the low-frequency-free signal in the decoded signal. The output signal thus includes a frequency component higher than a Nyquist frequency, which Nyquist frequency is half a sample frequency when the decoded signal is made discrete.

Hence, the decoding device according to the present invention can make a rise and fall of a signal corresponding to an edge part included in the decoded signal to be steep. In particular, the decoding device is capable of making the rise and fall of the signal corresponding to the edge part be highly sharper as compared to a sharpening process in which a linear operation is carried out.

As a result, the decoding device according to the present invention allows for highly sharpening contents indicated by the decoded signal. In particular, in a case in which the decoded signal is indicative of an image, the rise and fall of the signal corresponding to an outline part (edge) included in the image is made sharper. As a result, an effect is attained that it is possible to highly sharpen the image, improve blur in the image, and improve resolution of the image. Of course, the contents is similarly sharpened also in a case in which the decoded signal is indicative of audio, whereby sound quality is made clearer.

Furthermore, the decoding device according to the present invention is configured in such a manner that the contents are constituted of a plurality of frames that are consecutive in terms of time, and the encoded signal includes, in each frame, any one of a first signal or a second signal, the first signal being a signal in which the original signal is encoded and the second signal being a signal in which a part of frequency components included in the original signal is encoded, the decoding means further (i) generating, as the decoded signal when the first signal is decoded, a signal in which the first signal is decoded, and (ii) generating, as the decoded signal when the second signal is decoded, a signal by adding (a) a signal of a decoded signal generated immediately before that has been subjected to motion compensation with use of motion vector information calculated in the encoding, the motion vector information being used for carrying out interframe motion compensation prediction, to (b) a signal in which the second signal is decoded.

According to the configuration, the encoded signal includes, in each frame, any one of (1) a first signal in which an original signal is encoded, and (2) a second signal in which a part of frequency components included in the original signal is encoded. In a case of (1), the decoding device according to the present invention generates, as the decoded signal, a signal in which the first signal is decoded, whereas in a case of (2), the decoding device generates, as a subsequent decoded signal, a signal which adds (a) a signal of a decoded signal generated immediately before which has been subjected to motion compensation to (b) a signal in which the second signal is decoded. As a result, in either case of the (1) and (2), the decoded signal generated by the decoding device becomes a signal having an information amount equivalent to the original signal, however excluding the deterioration caused by the encoding and decoding.

Thereafter, the decoding device according to the present invention outputs a signal in which a nonlinear process is carried out to the decoded signal, in either case of (1) and (2). Namely, the contents indicated by the decoded signal is highly sharpened.

Hence, the decoding device according to the present invention can attain an effect that, even in the case in which an encoded signal includes, in each of the frames, any one of the first signal and the second signal, a decoded signal equivalent to the original signal can be generated, and furthermore, contents indicated by the decoded signal can be highly sharpened.

In the case of the foregoing (2), the subsequent decoded signal is generated by having the decoded signal generated immediately before serve as a standard signal. Hence, the larger the difference between the standard signal and the original signal is, the larger the difference between the decoded signal subsequently generated and the original signal is. Hence, it is preferable to have a signal in which the first signal is encoded serve as the decoded signal (standard signal) as it is at least for every predetermined frame, and prevent the difference between the standard signal and the original signal from becoming continuously large.

Moreover, the second signal is smaller in information amount than the first signal; when the encoding efficiency is to be made high (when the transmission rate is to be reduced), the first signal is to be made smaller in proportion with respect to the second signal. One example is to have the first signal be included per predetermined several hundred frames. On the other hand, when image quality of the image indicated by the decoded signal is given weight (when the transmission rate is increased), the first signal is to be made greater in proportion with respect to the second signal. One example is, to include the first signal per several frames.

Furthermore, the decoding device according to the present invention may be configured to further include signal interpolation means for interpolating the decoded signal.

According to the configuration, signal interpolation (interpolation, up sampling) is carried out to the decoded signal. Thereafter, a signal thus interpolated is subjected to nonlinear process; the signal having been subjected to the nonlinear process is outputted as the output signal.

An example of a case in which the interpolation is to be carried out is, for example, when a display device provided on a receiving side of a transmission system which transmits a signal for HDTV is a display having a pixel number of approximately 4000×2000 (so-called 4K display) etc., which is more than the pixel number of HDTV. In this case, the signal for the HDTV is up-converted on the receiving side, to carry out interpolation for displaying the image on the display device. However, if just the interpolation were simply carried out, the contents indicated by the interpolated signal would normally be unsharp. For example, in a case of image, the interpolation would cause blurring of the image or a reduction in the resolution of the image.

In comparison, according to the configuration of the decoding device, by carrying out the nonlinear process to the interpolated signal, the high-frequency band that exceeds the Nyquist frequency is compensated. Hence, it is possible to minimize the deterioration of contents caused by the interpolation. That is to say, an effect is attained that even if the interpolation of the signal is carried out to the decoded signal, it is possible to improve the blur in the image caused by the interpolation and minimize the decrease in the resolution. The same applies for the case of audio; an effect is attained that the deterioration in audio caused by the interpolation is minimized, and thus achieves a clear sound quality.

In a case in which the sharpening process is carried out to the signal after the interpolation by linear operation (conventional technique), the high-frequency band that exceeds the Nyquist frequency cannot be compensated. Hence, the deterioration of the contents cannot be improved that much. For example, in a case of an image, a blur remains in the image or its resolution is not much improved.

Furthermore, the encoding device according to the present invention may be configured in such a manner that the nonlinear process means includes: even exponentiation operation means for generating an even exponentiation signal by raising the low-frequency-free signal to an even exponent not less than 2; and sign changing means for generating the nonlinear process signal by reversing positive and negative signs of a part of the even exponentiation signal which part is different in sign from the low-frequency-free signal.

According to the configuration, an even exponentiation signal is further generated by raising the low-frequency-free signal to an even exponent not less than 2, and a nonlinear process signal is generated by reversing positive and negative signs of a part of the even exponentiation signal which part is different in sign from the frequency component prior to the exponentiation.

Hence, the low-frequency-free signal is raised to the even exponent of not less than 2, and the positive and negative signs of the low-frequency-free signal prior to the exponentiation is retained with the generated nonlinear process signal; this allows for an output signal obtained by adding the low-frequency-free signal and the nonlinear process signal to include a high frequency component not included in the low-frequency-free signal (i.e. not included in the decoded signal).

Therefore, such an effect is attained that it is possible to make a rise and fall of a signal corresponding to an edge part of the decoded signal be sharper than that as a result of carrying out linear operation to the decoded signal.

Furthermore, the encoding device according to the present invention may be configured in such a manner that the nonlinear process means includes: even exponentiation operation means for generating an even exponentiation signal by raising the low-frequency-free signal to an even exponent not less than 2; differentiation means for generating a differential signal by differentiating the even exponentiation signal; and sign changing means for generating the nonlinear process signal by reversing positive and negative signs of a part of the differential signal which part is different in sign from the low-frequency-free signal.

Furthermore, according to the configuration, (i) an even exponentiation signal is generated by raising the low-frequency-free signal to an even exponent of not less than 2, (ii) a differentiation signal is generated by differentiating the even exponentiation signal, and (iii) a nonlinear process signal is generated by reversing positive and negative signs of a part of the differentiation signal which part is different in sign from the frequency component prior to the exponentiation.

Hence, the low-frequency-free signal is removed by raising the low-frequency-free signal to the even exponent of not less than 2 and by differentiating a direct current component which may be included in the raised signal, and further a nonlinear process signal is generated by having positive and negative signs of the low-frequency-free signal prior to the exponentiation be retained. Accordingly, an output signal obtained by adding the low-frequency-free signal and the nonlinear process signal includes a frequency component that is not included in the low-frequency-free signal (i.e. not included in the decoded signal).

Therefore, such an effect is attained that it is possible to sharpen a rise and a fall of a signal corresponding to the edge part included in the decoded signal, as compared to the method of carrying out the linear operation to the decoded signal. The direct current component that can be included in the raised signal is removed by the differentiation; it is thus possible to further sharpen the rise and fall of the signal as compared to a case in which the direct current component is not removed from the raised signal.

Furthermore, the encoding device according to the present invention may be configured in such a manner that the nonlinear process means includes odd exponentiation operation means for generating the nonlinear process signal by raising the low-frequency-free signal to an odd exponent not less than 3.

According to the configuration, a nonlinear process signal is generated by raising the low-frequency-free signal to an odd exponent not less than 3.

Since the low-frequency-free signal raised to the odd exponent of not less than 3 is generated as the nonlinear process signal, an output signal obtained by adding the low-frequency-free signal and the nonlinear process signal includes a frequency component not included in the low-frequency-free signal (i.e. not included in the decoded signal).

Hence, an effect is attained that it is possible to sharpen the rise and fall of a signal corresponding to an edge part included in the decoded signal, than a method of carrying out the linear operation to the decoded signal.

Furthermore, the encoding device according to the present invention may be configured in such a manner that the nonlinear processing means includes square root operation means for generating a square root signal by multiplying (i) a square root of an absolute value of a value calculated by dividing the low-frequency-free signal by a possible maximum value of the low-frequency-free signal, by (ii) the maximum value; and sign changing means for generating the nonlinear process signal by reversing positive and negative signs of a part of the square root signal which part is different in sign from the low-frequency-free signal.

According to the configuration, a square root signal is generated as the nonlinear process signal, which square root signal is obtained by multiplying (i) a square root of an absolute value of a value calculated by dividing the low-frequency-free signal by a possible maximum value of the low-frequency-free signal (i.e. a normalized value of the low-frequency-free signal), by (ii) the maximum value, and in which positive and negative signs of the low-frequency-free signal are retained.

Hence, an output signal obtained by adding the low-frequency-free signal with the nonlinear process signal includes a high-frequency component not included in the low-frequency-free signal (i.e. not included in the decoded signal).

Hence, such an effect is attained that it is possible to sharpen the rise and fall of a signal corresponding to an edge part included in the decoded signal, than by a method of carrying out the linear operation to the decoded signal.

Furthermore, the encoding device according to the present invention may be configured in such a manner that the nonlinear process means further includes amplitude adjustment means for adjusting an amplitude of the nonlinear process signal by multiplying the amplitude by a predetermined magnification value.

According to the configuration, it is possible to adjust an amplitude of the output signal obtained by adding the low-frequency-free signal with the nonlinear process signal, to a suitable degree. Hence, an effect is attained that the amplitude of the output signal is prevented from becoming too great.

Furthermore, the encoding device according to the present invention may be configured in such a manner that when the values of the low-frequency-free signal are around 0, the nonlinear process means generates the nonlinear process signal so that the nonlinear process signal has an absolute value larger than that of the low-frequency-free signal.

According to the configuration, when the value of the low-frequency-free signal is in the vicinity of 0, a nonlinear process signal having a greater absolute value than an absolute value of the low-frequency-free signal is generated.

This allows for, in an interval in which the value of the low-frequency-free signal is in the vicinity of 0, having a value of the nonlinear process signal to be added to the low-frequency-free signal in generating the output signal be a value larger than the low-frequency-free signal.

Hence, such an effect is attained that it is possible to sharpen a rise and fall of a signal corresponding to the edge part in the decoded signal, in an interval in which the value of the low-frequency-free signal is in the vicinity of 0.

Furthermore, the encoding device may be configured in such a manner that the low-frequency component removing means is a high-pass filter having 3 or more taps.

According to the configuration, the low-frequency component removing means is a high-pass filter having 3 or more taps. This allows for appropriately removing at least the direct current component from the decoded signal.

Hence, an output signal obtained by adding (i) a nonlinear process signal in which a nonlinear process is carried out to a low-frequency-free signal in which the direct current component included in the decoded signal is removed to (ii) the low-frequency-free signal, includes a high-frequency component not included in the low-frequency-free signal (i.e. not included in the decoded signal).

Therefore, such an effect is attained that it is possible to sharpen a rise and fall of a signal corresponding to an edge part of the decoded signal, as compared to a method in which linear operation is carried out to the decoded signal.

Furthermore, the encoding device according to the present invention may be configured in such a manner that the low-frequency component removing means further includes: low-level signal removing means for changing, out of signal values of the low-frequency-free signal, signal values whose absolute values are lower than a predetermined lower limit to 0, and high-level signal removing means for changing, out of the signal values of the low-frequency-free signal, signal values whose absolute values are higher than a predetermined upper limit in such a manner that the absolute values are not higher than the predetermined upper limit while maintaining signs of that signal values.

According to the configuration, a signal value whose absolute value is lower than a predetermined lower limit out of signal values of the low-frequency-free signal is changed to 0, and a signal value whose absolute value is higher than a predetermined upper limit out of signal values of the low-frequency-free signal is changed in such a manner that the absolute value is not higher than the predetermined upper limit while maintaining signs of that signal value.

This allows for removing the noise included in the low-frequency-free signal, and allows for preventing the high-frequency component having a high energy and being included in the low-frequency-free signal be amplified by the nonlinear process.

Hence, it is possible to attain such an effect that noise is removed even from the output signal, and that amplification of a high-frequency component having high energy is prevented.

Moreover, a transmission system according to the present invention includes: an encoding device as a sending device, the encoding device outputting the encoding signal including a signal in which the original signal is encoded; and the decoding device as a receiving device.

According to the configuration, an encoded signal is outputted from an encoding device provided on a sending side. Meanwhile, a decoding device provided on a receiving side (i) receives the encoded signal as input, (ii) generates a decoded signal by decoding the encoded signal, and (ii) outputs, as an output signal, a signal in which a nonlinear process is carried out to a low-frequency-free signal included in the generated decoded signal.

Hence, the transmission system allows for decoding the encoded signal outputted from the encoding device by the decoding device, and allows for highly sharpening the contents indicated by the decoded signal. In particular, in a case in which the decoded signal is indicative of image, it is possible to make a rise and fall of a signal corresponding to an outline part (edge) included in the image be sharp. As a result, an effect is attained that the image can be made highly sharp, blur caused by the encoding and decoding be improved, and the resolution be improved. Of course, the same applies with the case of audio and the audio is also sharpened, thereby making the sound quality clear.

Furthermore, by carrying out the sharpening process to the decoding signal, it is possible to include the high-frequency component that exceeds the Nyquist frequency, into the decoded signal. As a result, at a time of encoding, it is possible to remove a part of frequency components in the original signal in advance, prior to carrying out the encoding. Hence, an effect is attained that it is possible to reduce the transmission rate in the transmission path in a case in which the encoded signal is transmitted from the encoding device to the decoding device. Since it is possible to reduce the transmission rate, it is possible to reduce the costs required for the data transmission.

Moreover, a transmission system according to the present invention includes: an encoding device as a sending device, the encoding device including (i) frequency component extracting means for extracting, from the original signal, a part of frequency components included in the original signal, to generate a frequency component extraction signal and (ii) encoding means for (a) encoding the frequency component extraction signal and the original signal in such a manner that the encoding is carried out while switching over between the frequency component extraction signal and the original signal, and (b) making the signal thus encoded be included in the encoded signal; and the decoding device, as a receiving device.

According to the configuration, the encoding device outputs an encoding signal including a signal that is encoded while switching over between the frequency component extraction signal and the original signal (for example, (1) including in one frame a first signal in which the original signal is encoded and (2) including in the other frames a second signal in which the frequency component extraction signal is encoded). The decoding device receives the encoded signal as input, and in the case of (1), the decoding device generates, as the decoded signal, a signal in which the first signal is encoded, whereas in the case of (2) the decoding device generates, as the decoded signal, a signal adding (a) a signal of a decoded signal generated immediately before to which motion compensation has been carried out, to (b) a signal in which the second signal is decoded. As a result, in either case of (1) or (2), the generated decoded signal becomes a signal equivalent to the original signal, excluding the deterioration caused by the encoding and decoding.

Furthermore, in either case of the (1) and (2), the decoding device according to the present invention outputs, as its signal output, a signal in which nonlinear process is carried out to the decoded signal. Namely, contents indicated by the decoded signal is highly sharpened Therefore, even in a case in which the decoded signal includes any one of the first signal and the second signal in each of the frames, an effect is attained that a decoded signal equivalent to the original signal can be generated, and that the contents indicated by the decoded signal is highly sharpened.

Moreover, the transmission system according to the present invention is configured in such a manner that the frequency component extracting means includes: high-frequency component removing means for removing a high-frequency component from frequency components of the original signal, to generate a high-frequency-free signal; harmonics generation means for generating harmonics of the high-frequency-free signal; and subtraction means for subtracting the harmonics of the high-frequency-free signal from the original signal, to generate the frequency component extraction signal, the harmonics generation means including: second low-frequency component removing means for removing, from frequency components of the high-frequency-free signal, a low-frequency component at least including a direct current component, to generate a second low-frequency-free signal; second nonlinear process means for generating a second nonlinear process signal (i) in which positive and negative signs of the second low-frequency-free signal are retained and (ii) which broadly monotonically increases nonlinearly with respect to the second low-frequency-free signal when values of the second low-frequency-free signal are at least in the vicinity of 0; and second addition means for adding the second nonlinear process signal to the high-frequency-free signal, to generate the harmonics.

According to the configuration, the encoding device generates a frequency component extraction signal by subtracting harmonics of a high-frequency-free signal from the original signal, which high-frequency-free signal is obtained by removing high-frequency components of frequency components included in the original signal from the original signal. In generating the harmonics of the high-frequency-free signal, initially, a second low-frequency-free signal is generated by removing at least a direct current component from a high-frequency-free signal, from frequency components of the high-frequency-free signal. Thereafter, a second nonlinear process signal is generated, (i) in which positive and negative signs of the second low-frequency-free signal is retained and (ii) which broadly monotonically increases nonlinearly with respect to the low-frequency-free signal when values of the low-frequency-free signal are at least in the vicinity of 0. By adding the second nonlinear process signal to the high-frequency-free signal, the harmonics is outputted.

Namely, the frequency component extraction signal can be said as a high-frequency component included in the original signal. In the case of image, the frequency component extraction signal corresponds to an outline part (edge) of the image. However, the frequency component extraction signal does not include the high-frequency components in the vicinity of the Nyquist frequency of the original signal, so thus no noise or small edges are included.

Thereafter, the decoding device decodes while switching between the original signal and the frequency component extraction signal, and the original signal and the frequency component extraction signal are included in the encoded signal as the first signal and the second signal, respectively, and the encoded signal is outputted. Thereafter, the decoding device receives the encoded signal as input; when the first signal is to be decoded, a signal in which the first signal is decoded is generated as the decoded signal.

On the other hand, when the second signal is to be decoded, a signal adding (a) a signal of a decoded signal generated immediately before (hereinafter, also referred to as a standard signal) to which motion compensation is carried out, to (b) a signal in which the second signal is decoded, is generated as the decoded signal. The signal in which the second signal is decoded is a signal which indicates a high-frequency component included in the original signal; for example in the case of an image, by carrying out the addition, a signal corresponding to the outline part (edge) is added to a signal of a standard signal to which motion compensation is carried out.

Hence, the decoded signal generated by decoding any one of the first signal and the second signal serves as a signal equivalent to the original signal, excluding the deterioration caused by the encoding and the decoding. In either case, nonlinear process is carried out to the decoded signal, to highly sharpen contents indicated by the decoded signal.

Accordingly, an effect is attained that a decoded signal equivalent to the original signal can be generated and contents indicated by the decoded signal is highly sharpened, even in a case in which the encoded signal includes, in each frame, any one of the first signal in which the original signal is encoded and the second signal in which the frequency component extraction signal included in the original signal is encoded.

The decoding device can be accomplished by a computer. In this case, a control program of the decoding device which causes a computer to operate as means to accomplish the decoding device, and a computer-readable recording medium on which the control program is recorded, are also within the scope of the present invention.

Furthermore, a chip including a circuit that executes the means and a ROM (read only memory) storing the control program are also within the scope of the present invention.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to a transmission system that transmits data from a transmitting side including an encoding device to a receiving side including a decoding device. In particular, the present invention is suitably applicable to a transmission system that transmits image, audio and the like upon encoding the image, audio and the like.

REFERENCE SIGNS LIST

11 high frequency component extracting section (low-frequency component removing means, second low-frequency component removing means)
15 addition section (addition means, second addition means)
21 nonlinear operation section (even exponentiation operation means, square root operation means)
22 nonlinear operation section (odd exponentiation operation means)
31 differentiation section (differentiation means)
41 sign changing section (sign changing means)
51 limiter (amplitude adjustment means)
100, 100a-100e sharpening process section (harmonics generation means)
102, 102a-102e nonlinear process section (nonlinear process means, second nonlinear process means)
132 rounding process section (low-level signal removing means)
133 limiter (high-level signal removing means)
200, 200a-200g encoding device
210 low pass filter (high-frequency component removing means, frequency component extracting means)
215 high-pass filter (frequency component extracting means)
221, 222 encoding process section (encoding means)
230 frequency component extraction section (frequency component extracting means)
250 subtraction section (subtraction means)
300, 300a-300g decoding device
310 decoding process section (decoding means)
311, 312, 314 decoding control section (decoding means)
360 up sampler (signal interpolation means)
900 transmission system
S11 high-frequency signal (low-frequency-free signal, second low-frequency-free signal)
S12 nonlinear process signal (second nonlinear process signal)
S21 nonlinear signal (even exponentiation signal, square root signal)
S22 nonlinear signal
S31 differentiation signal
S210 high-frequency-free signal (frequency component extraction signal)
S215 low-frequency-free signal (frequency component extraction signal)
S220, S221, S222 encoded signal
S250 difference signal (frequency component extraction signal)
S310 decoded signal
S311, S312 decoding result signal (decoded signal)
SR original signal

The invention claimed is:

1. A transmission system comprising:
a decoding device as a receiving device, the decoding device outputs an output signal by receiving, as an input, an encoded signal including a signal in which an original signal is encoded, the original signal being indicative of contents of at least one of image and audio, and the output signal being indicative of the contents, the decoding device including,
   a decoder configured to decoding the encoded signal, to generate a decoded signal,
   an up sampler configured to up-convert the decoded signal,
   a low-frequency component removing filter configured to generate a low-frequency-free signal by removing, a low-frequency component including at least a direct current component from the up-converted decoded signal,
   a nonlinear processor configured to generate a nonlinear process signal (i) in which positive and negative signs of the low-frequency-free signal are retained and (ii) which monotonically increases nonlinearly based on the low-frequency-free signal when values of the low-frequency-free signal are at least in the vicinity of 0, and
   an adder configured to add the nonlinear process signal to the up-converted decoded signal, to generate an addition signal,
      the addition signal being the output signal, the contents are constituted of a plurality of frames that are consecutive in terms of time,
      the encoded signal includes, in each frame, any one of a first signal or a second signal, the first signal being a signal in which the original signal is encoded and the second signal being a signal in which a part of frequency components included in the original signal is encoded, and
      the decoder is configured to further (i) generate, as the decoded signal when the first signal is decoded, the decoded first signal, and (ii) generate the decoded signal by adding (a) a signal of a subsequent decoded signal generated immediately before that has been subjected to motion compensation with use of motion vector information calculated in the encoding, the motion vector information being used for carrying out inter-frame motion compensation prediction, to (b) a signal in which the second signal is decoded, when the second signal is decoded; and
an encoding device as a sending device, the encoding device including (i) a frequency component extracting filter configured to extract, from the original signal, a part of frequency components included in the original signal, to generate a frequency component extraction signal and (ii) an encoder configured to (a) encode the frequency component extraction signal and the original signal in such a manner that the encoding is carried out while switching over between the frequency component extraction signal and the original signal, and (b) make the signal thus encoded be included in the encoded signal.

2. The encoding device according to claim 1, wherein the frequency component extracting filter includes,
a high-frequency component removing filter configured to remove a high-frequency component from the original signal to generate a high-frequency-free signal;
a harmonics generator configured to generate harmonics of the high-frequency-free signal; and
a subtractor configured to subtract the harmonics of the high-frequency-free signal from the original signal, to generate the frequency component extraction signal, and
the harmonics generator including,
a second low-frequency component removing filter configured to remove a low-frequency component at least including a direct current component from the high-frequency-free signal, to generate a second low-frequency-free signal;
a second nonlinear processor configured to generate a second nonlinear process signal (i) in which positive and negative signs of the second low-frequency-free signal are retained and (ii) which monotonically increases nonlinearly based on the second low-frequency-free signal when values of the second low-frequency-free signal are at least in the vicinity of 0; and
a second adder configured to add the second nonlinear process signal to the high-frequency-free signal, to generate the harmonics.

3. The decoding device according to claim 1, wherein the nonlinear processor includes:
an even exponentiation operator configured to generate an even exponentiation signal by raising the low-frequency-free signal to an even exponent not less than 2; and
a sign changer configured to generate the nonlinear process signal by reversing a sign of a part of the even exponentiation signal which is different from a sign of the low-frequency-free signal.

4. The decoding device according to claim 1, wherein the nonlinear processor includes:
an even exponentiation operator configured to generate an even exponentiation signal by raising the low-frequency-free signal to an even exponent not less than 2;
a differentiator configured to generate a differential signal by differentiating the even exponentiation signal; and
a sign changer configured to generate the nonlinear process signal by reversing a sign of a part of the differential signal which is different in sign from the low-frequency-free signal.

5. The decoding device according to claim 1, wherein the nonlinear processor includes odd an exponentiation operator configured to generate the nonlinear process signal by raising the low-frequency-free signal to an odd exponent not less than 3.

6. The decoding device according to claim 1, wherein the nonlinear processor includes:
a square root operator configured to generate a square root signal by multiplying (i) a square root of an absolute value of a value calculated by dividing the low-frequency-free signal by a possible maximum value of the low-frequency-free signal, by (ii) the possible maximum value; and
a sign changer configured to generate the nonlinear process signal by reversing a sign of a part of the square root signal which is different from a sign of the low-frequency-free signal.

7. The decoding device according to claim 1, wherein the nonlinear processor further includes an amplitude adjuster configured to adjust an amplitude of the nonlinear process signal by multiplying the amplitude by a magnification value.

8. The decoding device according to claim 1, wherein when the values of the low-frequency-free signal are around 0, the nonlinear processor generates the nonlinear process signal so that the nonlinear process signal has an absolute value larger than that of the low-frequency-free signal.

9. The decoding device according to claim 1, wherein the low-frequency component removing filter is a high-pass filter having 3 or more taps.

10. The decoding device according to claim 1, wherein
the low-frequency component removing filter further includes:
a low-level signal removing filter configured to change first signal values of the low-frequency-free signal whose absolute values are lower than a lower limit to 0; and
a high-level signal removing filter configured to change second signal values of the low-frequency-free signal whose absolute values are higher than a upper limit in such a manner that the absolute values of the second signal values of the low-frequency-free signal are not higher than the upper limit while maintaining signs of the second signal values.

* * * * *